United States Patent
Takeda et al.

[11] Patent Number: 5,940,461
[45] Date of Patent: Aug. 17, 1999

[54] REACTOR CORE FOR A LIGHT WATER COOLED REACTOR, FUEL ASSEMBLY AND CONTROL ROD

[75] Inventors: Renzo Takeda, Kawasaki; Motoo Aoyama, Mito; Masanao Moriwaki, Hitachi, all of Japan

[73] Assignee: Hitachi, Ltd., Tokyo, Japan

[21] Appl. No.: 09/070,246

[22] Filed: May 1, 1998

Related U.S. Application Data

[62] Division of application No. 08/498,757, Jul. 6, 1995, Pat. No. 5,812,621.

[30] Foreign Application Priority Data

Jul. 8, 1994 [JP] Japan ................ 6-156989

[51] Int. Cl.$^6$ .................................................. G21C 1/04
[52] U.S. Cl. ............................................ 376/171; 376/428
[58] Field of Search ................................. 376/170–173, 376/370, 428

[56] References Cited

U.S. PATENT DOCUMENTS

| | | |
|---|---|---|
| 3,660,230 | 5/1972 | Bailey, Jr. et al. . |
| 4,968,476 | 11/1990 | Radkowsky ............................ 376/172 |
| 5,145,635 | 9/1992 | Ishii et al. ............................. 376/173 |
| 5,204,053 | 4/1993 | Fennern ............................... 376/370 X |

FOREIGN PATENT DOCUMENTS

| | | |
|---|---|---|
| 55-10591 | 1/1980 | Japan . |
| 1-227993 | 9/1989 | Japan . |
| 2-228591 | 9/1990 | Japan . |
| 3-85490 | 4/1991 | Japan . |
| 3-262993 | 11/1991 | Japan . |
| 4-301792 | 10/1992 | Japan . |
| 5-164874 | 6/1993 | Japan . |

*Primary Examiner*—Daniel D. Wasil
*Attorney, Agent, or Firm*—Fay, Sharpe, Beall, Fagan, Minnich & McKee

[57] ABSTRACT

To provide a reactor core for light water cooled reactor, a fuel assembly and a control rod intended for Pu multi-recycling at a breeding ratio of about 1.0, or 1.0 or more while keeping the economical or safety performance to the same level as in BWR now under operation, that is, while minimizing the change for the incore structures and maintaining the void coefficient negative. A reactor core for a light water cooled reactor having an effective fuel-to-water volume ratio of 0.1 to 0.6 by the combination of a dense lattice fuel assembly constituted of fuel rods formed by adding Pu to degraded uranium, natural uranium, depleted uranium or low concentrated uranium, coolants at high void fraction of 45% to 70% and a cluster-type, Y-type or cruciform control rod.

11 Claims, 27 Drawing Sheets

DRAWINGS

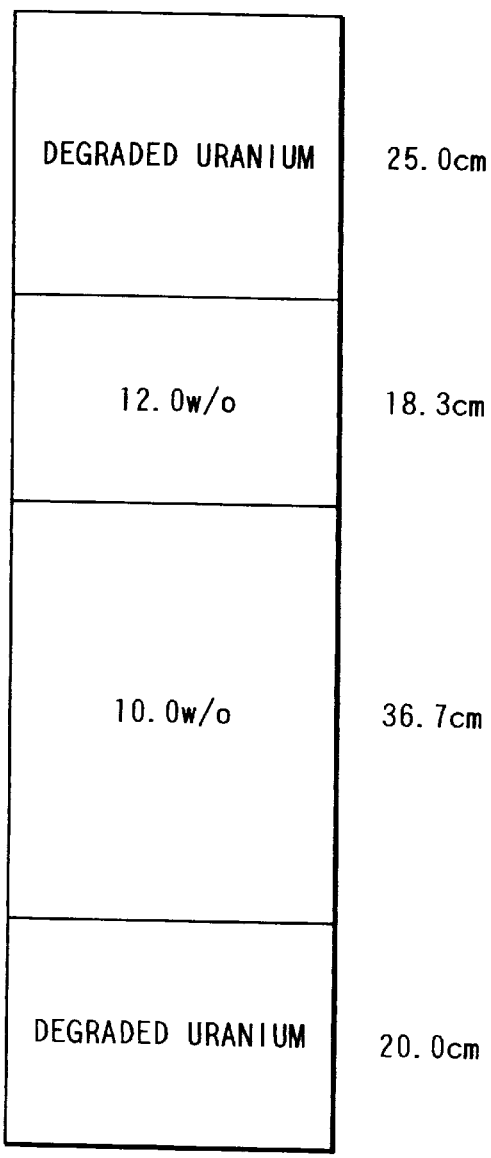
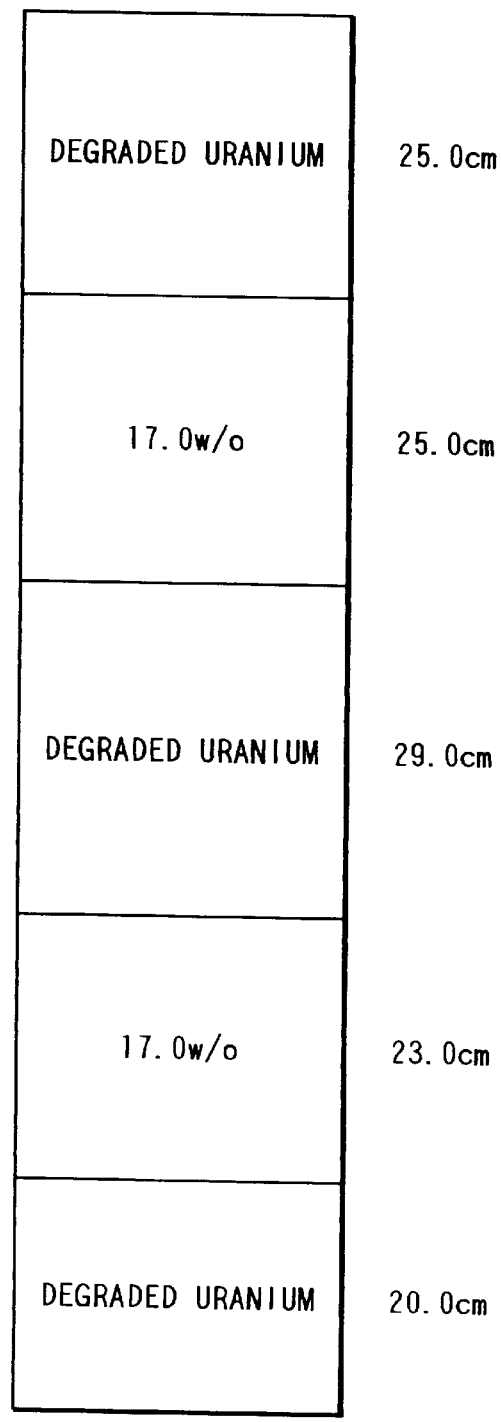

⊜ 9.0 w/o
○ 10.1 w/o

REACTOR CORE FOR A LIGHT WATER COOLED REACTOR, FUEL ASSEMBLY AND CONTROL ROD

This is a divisional application of U.S. Ser. No. 08/498, 757, filed Jul. 6, 1995, now U.S. Pat. No. 5,812,621.

BACKGROUND OF THE INVENTION

The present invention concerns a reactor core for a light water cooled reactor, and a fuel assembly and a control rod constituting the reactor core and, more in particular, it relates to a reactor core for a light water cooled reactor, a fuel assembly and a control rod intended for Pu multi-recycling at a breeding ratio of about 1.0 or slightly greater than 1.0 while keeping the economical and safety performance to the same level as in a BWR (Boiling water reactor) now under operation, that is, while minimizing change of in core structures and maintaining a negative void coefficient.

In a nuclear reactor, consumption of fissionable materials such as uranium-235 and plutonium-239 and conversion of fuel fertile materials such as uranium-238 and plutonium-240 into fissionable materials take place by nuclear reactions. A ratio between an amount of fissionable materials contained in fuels taken out of a reactor core and an amount of fissionable materials contained in fuels to be loaded in the reactor core is referred to as a breeding ratio, and the breeding ratio is about at 0.5 in existent light water cooled nuclear reactors. As a method of effectively utilizing uranium resources, it has been considered to increase the breeding ratio.

Japanese Patent Laid-Open Sho 55-10591 or Nuclear Technology, vol. 59, 212–227 pp, 1982 disclose that the breeding ratio can be improved by densely arranging fuel rods in a triangular lattice pattern to reduce a water-to-fuel volume ratio in a pressurized water type nuclear reactor. However, the breeding ratio is about 0.9 at the greatest and fissionable materials have to be supplemented for continuous operation without lowering the power. For further increasing the breeding ratio, it may be considered to make a fuel rod gap narrower to further decrease the water-to-fuel volume ratio, but it suffers from a limit, for an embodiment is difficult to attain, in view of manufacture of fuel assemblies and ensurance of thermal margin.

On the other hand, Japanese Patent Laid-Open Hei 1-227993 discloses a method of effectively reducing the water-to-fuel volume ratio by utilizing steam voids generated in a reactor core, which is a feature of a boiling water type nuclear reactor. However, it has been shown in the prior art to make the plutonium breeding ratio (a ratio between the amount of fissionable plutonium contained in fuels taken out of a reactor core and an amount of fissionable plutonium contained in fuels loaded in the reactor core; breeding ratio relative to fissionable plutonium) to about 1, but it is not shown to make the breeding ratio (a value is smaller by about 4 to 5% than plutonium breeding ratio in a case of enriching natural uranium with plutonium) to about 1, or 1 or more. If the plutonium breeding ratio is about 1, it is necessary to enrich natural uranium with plutonium for continuing operation without lowering the power and the uranium resources can not be used up thoroughly. In the present invention, the breeding ratio of about 1 means a value 0.98 or more.

SUMMARY OF THE INVENTION

A first object of the present invention is to provide a reactor core and a fuel assembly capable of maintaining the power generation cost, thermal margin and safety about to the same level as in light water cooled reactors now under operation, thereby contributing to stable long time energy supply.

A second object of the present invention is to provide a reactor core, a fuel assembly and a control rod for attaining a breeding ratio at 1.0 with a Pu-enriched degraded uranium fuel by reducing the water-to-fuel volume ratio for contributing to stable long time energy supply.

A third object of the present invention is to provide a reactor core and a fuel assembly capable of operating as many nuclear power reactors as possible with a predetermined amount of Pu by reducing a required Pu inventory per unit power for contributing to stable long time energy supply.

A fourth object of the present invention is to provide a reactor core and a fuel assembly capable of attaining the same extent of power and same extent of burnup degree with the same extent of thermal margin by using the same materials and about the same size of a pressure vessel as those in reactors now under operation for making the power generation cost about equal with that in the existent light water cooled reactors.

A fifth object of the present invention is to provide a reactor core and a fuel assembly capable of attaining a negative void coefficient by increase of neutron leakage in the direction of a reactor core height and power distribution swing in the direction of the reactor core height upon power up in order to make the safety to the same extent as in existent light water cooled reactors.

A sixth object of the present invention is to provide a reactor core capable of confining radioactivated materials present in the reactor within a pressure vessel by maintaining a distillation function due to boiling in order to make the safety to the same extent as the existent light water cooled reactors.

A seventh object of the present invention is to provide a reactor core and a fuel assembly capable of recycling Pu and U simultaneously while abolishing sole Pu extraction for coping with nuclear nonproliferation.

An eighth object of the present invention is to provide a reactor core and a fuel assembly for causing actinoid nuclides together with uranium and plutonium in the reactor and recycling them in order not to leave long life radioactive wastes in future generations.

For attaining the first object, there is provided in accordance with the present invention, a reactor core having fuels comprising uranium containing at least one of degraded uranium, natural uranium, depleted uranium and low concentrated uranium, enriched with Pu or Pu and actinoid nuclides, wherein a breeding ratio is about 1.0, or 1.0 or more and a void coefficient is negative.

Further, for attaining the first object, there is provided in accordance with the present invention, a fuel assembly having fuels comprising uranium containing at least one of degraded uranium, natural uranium, depleted uranium and low concentrated uranium, enriched with Pu or Pu and actinoid nuclides, wherein a breeding ratio is about 1.0, or 1.0 or more.

Further, for attaining the second object, there is provided in accordance with the present invention, a hexagonal dense fuel assembly comprising fuel rods arranged in a regular triangular lattice pattern, wherein a gap between the fuel rods is from 0.7 to 2.0 mm, as well as a reactor core constituted with the fuel assembly.

Further, for attaining the second object, there is provided in accordance with the present invention, a reactor core and a fuel assembly wherein an effective water-to-fuel volume ratio is between 0.1 and 0.6.

Further, for attaining the second object, there is provided in accordance with the present invention, a reactor core for a light water cooled reactor wherein an average enrichment of fissionable Pu in a reactor core is from 6 to 20% except for outer circumferential portion and blanket portions in upper and lower ends of a reactor core.

Further, for attaining the second object, there is provided in accordance with the present invention, a fuel assembly wherein an average enrichment of fissionable Pu is from 6 to 20% in a region excepting for blanket portions at both of upper and lower ends.

Further, for attaining the second object, there is provided in accordance with the present invention, a boiling water type light water cooled reactor wherein an average void fraction in the reactor core is from 45 to 70% during operation at 50% or more rated power.

Further, for attaining the second object, there is provided in accordance with the present invention, a reactor core for a light water cooled reactor comprising hexagonal fuel assemblies and a cluster-type control rod inserted therein.

Further, for attaining the second object, there is provided in accordance with the present invention, a reactor core for a light water cooled reactor comprising hexagonal fuel assemblies and Y-type control rods each inserted therein and having three wings at 120 degree spacing between each of the wings.

Further, for attaining the second object, there is provided in accordance with the present invention, a reactor core for a light water cooled reactor, wherein the Y-type control rods adjacent to a regular hexagonal fuel assembly each has two or less wings, and a gap between fuel assemblies not inserted with the wing between the fuel assemblies is narrower than a gap between the fuel assembles inserted with the wing.

Further, for attaining the second object, there is provided in accordance with the present invention, a reactor core for a light water cooled reactor comprising square fuel assemblies arranged densely in a regular triangular lattice pattern and cross type control rods each having four wings to be inserted therebetween at a spacing of 90 degree between each other wings.

Further, for attaining the second object, there is provided in accordance with the present invention, a reactor core for a light water cooled reactor having eclipsed hexagonal fuel assemblies in which fuel rods are arranged in a regular triangular lattice pattern, wherein the number of rows of two sets of fuel rods is equal to each other and is greater by one row than the number of the rows of the remaining one set of fuel rods among three sets of rows of fuel rods in parallel with opposing rows of fuel rods at the outermost layer, and a regular hexagonal fuel assembly lattice is constituted of the eclipsed hexagonal fuel assembly and a wing of the Y-type control rod.

Further, for attaining the second object, there is provided in accordance with the present invention, a reactor core for a light water cooled reactor comprising a cluster type, Y-type or cruciform control rod having a follower portion at the top end of the control rod made of a material having a smaller moderating function than that of light water, for embodiment, carbon, heavy water, beryllium, Zr alloy or stainless steel for excluding moderators.

For attaining the second object, there is provided in accordance with the present invention, a hexagonal fuel assembly and an eclipsed hexagonal fuel assembly wherein at least two or more regions ranging from a region adjacent to the Y-type control rod to a region apart from the Y-type control rod are constituted of plural kinds, particularly, two to five kinds of fuel rods of different enrichments of fissionable Pu.

For attaining the second object, there is provided in accordance with the present invention, a square fuel assembly, wherein at least two or more regions ranging from a region adjacent to the cruciform control rod to a region apart from the cruciform control rod are constituted with plural kinds, particularly, two to five kinds of fuel rods of different enrichments of fissionable Pu.

For attaining the third, fourth and fifth objects, there is provided in accordance with the present invention, a reactor core for a light water cooled reactor wherein an average power density in the reactor core is from 100 kW/l to 300 kW/l excepting for blanket portions at the outer circumference and at upper and lower ends of a reactor core.

For attaining the third, fourth and fifth objects, there is provided in accordance with the present invention, a reactor core for a light water cooled reactor wherein a portion having an average enrichment of fissionable Pu along the horizontal cross section of the fuel assembly of 6 w/o or more is between 40 cm and 140 cm with respect to the axial direction excepting for the blanket portions at both of upper and lower ends of the reactor core.

For attaining the third, fourth and fifth objects, there is provided in accordance with the present invention, a fuel assembly wherein a portion having an average enrichment of fissionable Pu along the horizontal cross section of the fuel assembly of 6 w/o or more is between 40 cm and 140 cm with respect to the axial direction of the fuel assembly excepting for the blanket portions at both of upper and lower ends.

Further, for attaining the fourth object, there is provided in accordance with the present invention, a reactor core for a light water cooled reactor wherein the reactor core is bisected radially into equal areas except for the outermost circumference of the reactor core and fuel assemblies are loaded such that an average value for the number of core staying cycles of the fuel assemblies in the outer reactor core region is made smaller than that in the inner reactor core region.

Further, for attaining the fourth object, there is provided in accordance with the present invention, a reactor core for a light water cooled reactor wherein an average orifice pressure loss coefficient of fuel assemblies at or adjacent to the outermost circumference of a reactor core is greater than an average orifice pressure loss coefficient in other regions.

Further, for attaining the fifth object, there is provided in accordance with the present invention, a hexagonal fuel assembly wherein an average value of the enrichment of fissionable Pu in a lower half portion is less than an average value in an the upper half portion excepting for the blanket portions at both of upper and lower ends.

Further, for attaining the fifth object, there is provided in accordance with the present invention, a fuel assembly wherein portions having an enrichment of fissionable Pu of 6 w/o or more are disposed in upper and lower portions along the axial direction of the fuel assembly excepting for the blanket portions at both of the upper and lower ends, and the enrichment of fissionable Pu in a region therebetween near a central portion is 6 w/o or less.

Further, for attaining the sixth object, there is provided in accordance with the present invention, a reactor core for a boiling water type light water cooled reactor, wherein the steam weight ratio of coolants at an exit of the reactor core is from 20% to 40% during operation at 50% or more rated power.

Further, for attaining the seventh object, there is provided in accordance with the present invention, a reactor core for a light water cooled reactor and a fuel assembly, wherein Pu and uranium are recycled simultaneously.

Further, for attaining the eighth object, there is provided in accordance with the present invention, a reactor core for a light water cooled reactor and a fuel assembly, wherein Pu, uranium and actinoids are recycled simultaneously.

According to the studies made by the present inventors of the application, the following have been found.

The amount of natural uranium resources in the world is estimated to be about 15,000,000 tons, which corresponds to an amount capable of operating 1,000 units of existent light water cooled reactors with 1,000,000 kW of electric power for about 100 years. As a result, degraded uranium of nearly about 15,000,000 tons and fissionable Pu of 15,000 tons will be left. Accordingly, a power reactor (RBWR) at a breeding ratio of 1.0 can continue nuclear fission for degraded uranium using fuels containing Pu-enriched degraded uranium under the catalyst-like effect of Pu with inside and outside inventory of fissionable Pu at 10 tons per 1,000,000 kW electric power. Since uranium generates a heat energy of about 1 MWD per 1 g, 1,500 units of RBWR can be operated for 10,000 years and the entire uranium resources can be used up thoroughly so that it can contribute to the stable long time supply for the first object.

Further, the second object can be attained by the functions described below. According to the studies of the present inventors, for the relationship between the breeding ratio and the effective water-to-fuel volume ratio in the reactor core of the light water cooled reactor, the followings have been found. The effective water-to-fuel volume ratio [(Vm/Vf)eff] is extended from the geometrical water-to-fuel volume ratio [(Vm/Vf)geo; water-to-fuel volume ratio not generating steam void] considering generation of steam void in the reactor core. Assuming the decreasing ratio of hydrogen density due to generation of the steam void as F, there is the following relationship between both of them.

$(Vm/Vf)\text{eff} = F(Vm/Vf)\text{geo}$ \hfill (equation 1)

Further, F has the following relationship with the average steam void fraction V (%) for reactor core.

$F = (100-V)/100 + f\, V/100$ where

F is the ratio of saturated steam density to saturated water density.

Generally, f is a value as small as about 1/20 and F can be approximated as below.

$F = (100-V)/100$

FIG. 2 shows a conversion ratio defined from an effective water-to-fuel volume ratio and neutron balance, and relationship between each of three factors constituting the conversion ratio.

Conversion ratio $= \alpha(1+\beta) - (1+\gamma)$ \hfill (equation 2)

where

α: number of new neutrons generated when a neutron is absorbed in a fissionable material and one fissionable material is annihilated.

β: additional contribution by nuclear fission of fuel fertile material in a high speed energy region.

γ: ratio of wasteful neutron capture relative to neutron absorption amount by fissionable material (including neutron leakage).

In the light water cooled reactors now under operation, the effective water-to-fuel volume ratio is about 2.0 and the breeding ratio is about 0.5. For attaining the breeding ratio at about 1, it is necessary to make the conversion ratio to about 1. According to the studies of the present inventors, it has been found that the breeding ratio of about 1 at a conversion ratio of 0.85 or more can be achieved by increasing the enrichment of fissionable Pu within a range to be described later and increasing the neutron leakage to the blanket. The effective water-to-fuel volume ratio for this purpose is 0.6 or less. On the other hand, for obtaining the effective fuel-to-water volume ratio of 0.1 or less, the average steam void fraction for the reactor core has to exceed 70%, so that a two phase flow state can no more be maintained at the exit of the reactor core upon transient event.

The effective water-to-fuel volume ratio of 0.1 to 0.6 can be attained by densely arranging fuel rods, utilizing the steam void generated in the reactor core or, if the control rod is not inserted, by inserting a follower at a control rod insertion position to exclude the moderator, or by the combination of such three means. FIG. 3 shows an embodiment of a relationship between the fuel rod gap and the geometrical water-to-fuel volume ratio. In FIG. 3, the diameter of the fuel rod is within a range about from 9.5 to 12.3 mm which is used at present in light water cooled reactors and a regular triangular fuel rod lattice is adopted. If the fuel rod gap is reduced to 2 mm or less, (Vm/Vf)geo of the fuel rod lattice is about 0.9 or less. In a case of a fuel assembly having fuel rods arranged densely in a regular triangular lattice pattern, (Vm/Vf)geo of the fuel assembly takes a value greater by 0.1 to 0.2 than (Vm/Vf)geo of the fuel rod lattice, in view of a gap region or a control rod insertion region between the fuel assemblies. Accordingly, for attaining the effective water-to-fuel volume ratio of 0.6 or less under the geometrical water-to-fuel volume ratio, it is necessary to make the average steam void fraction for the reactor core to 45% or more in view of equation 1 (steam weight ratio at the exit of the reactor core is 20% or more in view of the relationship shown in FIG. 27). On the other hand, at a fuel rod gap within a range from 0.7 (minimum value for the fuel rod gap considering manufacture of the fuel assembly and ensurance for the thermal margin) to 1.0 mm (it can be more than 1.0 mm in a case where the diameter of the fuel rod is greater than 9.5 mm), (Vm/Vf)geo can be reduced to about 0.6 or less at the steam void fraction of 0%.

FIG. 4 shows a relationship between the average enrichment of fissionable Pu of the fuel assembly and the breeding ratio. For maintaining the reactor core in a critical state throughout the operation period, it is necessary to increase the fissionable Pu enrichment to 6 wt % or more. On the other hand, while the breeding ratio decreases along with the fissionable Pu enrichment it has been found that the breeding ratio of about 1 can be attained up to 20 wt % by utilizing the increase of the excess reactivity and increasing the neutron leakage to the blanket as described above.

Further, in this case, as the means for controlling the reactivity, a method may be considered of inserting a cluster-type control rod into the fuel assembly, or inserting a Y-type control rod at the periphery of the hexagonal fuel assembly or inserting a cruciform control rod at the periphery of the square fuel assembly. A reactor core having a breeding ratio of 1.0 can be attained by the combination of the foregoing means.

Further, the third, fourth and fifth objects can be attained by the following functions. According to the studies of the present inventors, it has been found that the height of the fuel assembly (effective reactor core length: length of a region having an average fissionable Pu enrichment of 6 wt % or more along a horizontal cross section) can be reduced while ensuring thermal margin by setting the power of fuel assemblies per unit horizontal cross section of the reactor core to the same extent as that in the existent boiling water type light water cooled reactor. As a result of densely arranging the fuel rods for reducing the effective water-to-fuel volume ratio to 0.6 or less, the number of fuel rods per unit horizontal cross section of the reactor core is 3 to 4 times of the existent boiling water type light water cooled reactor. Accordingly, the height of the fuel assembly (effective reactor core length) providing the same extent of average linear power density is about ⅓ to ¼ of the existent boiling water type light water cooled reactor. Further, since the moderators are homogeneously dispersed as compared with the existent boiling water type light water cooled reactor, the local power peaking coefficient of the fuel rod can be reduced by about 30% or more (by using the enrichment distribution if necessary). Further, the power peaking coefficient can be reduced by about 40% or more due to less change of burning reactivity and void reactivity and further in combination with other means to be described later. Accordingly, the height of the fuel assembly (effective reactor core length) providing an average linear power density equal to or greater than that of the existent boiling water type light water cooled reactor is 40 cm or more, which is about ⅒ thereof. On the other hand, by making the effective reactor core length shorter to increase the axial neutron leakage, the effect of reducing the void coefficient can be utilized. It has been found according to the studies of the present inventors, that negative void coefficient can be achieved in combination with other means described later if the effective reactor core length is set to 140 cm or less. While the power generation ratio in the blanket portion is increased by reducing the length, the average power density in the region excepting for the blanket portion is about 100 to 300 kW/l by the reduction of the effective reactor core length.

As a result, since RBWR producing the same power can be contained within a pressure vessel having the diameter about equal to that in the existent reactor, the power generation cost can be kept about the same as that in the existent light water cooled reactor and the safety can also be kept at a level about equal to that in the existent light water cooled reactor. Further, this can decrease the Pu inventory and, accordingly, a number of power reactors can be operated by a predetermined amount of Pu to attain stable energy supply.

Further, the fifth object can be attained by the following functions. According to the studies of the present inventors, the axial power distribution of the reactor core can be flattened by increasing the fissionable Pu enrichment in the upper portion of the reactor core to greater than that in the lower portion of the reactor core and, as a result, the Pu inventory can be decreased. Further, while the steam void fraction in the reactor core is increased upon power up or lowering of the reactor core coolant flow rate as shown in FIG. 5, the power distribution swings to the lower portion of the reactor core where the fissionable Pu enrichment is relatively low and neutron importance is small thereby enabling to reduce the reactivity of the reactor core (negative void coefficient).

Further, the second object can be attained by the following functions. According to the studies of the present inventors, a reactor core constitution in which fuel rods are arranged densely in a regular triangular lattice pattern can be attained by inserting a cluster-type control rod in the fuel assembly. Further, according to the studies of the present inventors, a reactor core constitution in which fuel rods are arranged densely in a regular triangular lattice pattern can be attained also by combining the hexagonal fuel assembly and a Y-type control rod. The Y-type control rod and the hexagonal fuel assembly can be combined by a method of making a fuel assembly into a regular hexagonal shape and by a method of constituting a regular hexagonal shape with one wing of the Y-type control rod and a fuel assembly. The former has a merit capable of simplifying the constitution of the fuel assembly and the latter has a merit of making the central position of the assembly in the reactor core as a regular triangular shape. Further, according to the studies of the present inventors, a reactor core constitution in which fuel rods are arranged densely in a regular triangular lattice pattern can be attained also by combining a square fuel assembly with a cruciform control rod.

Further, according to the studies of the present inventors, in a combination of the hexagonal fuel assembly and the Y-type control rod or a combination of the square fuel assembly and the cruciform control rod, a neutron moderating effect of water is increased upon withdrawal of the control rod for the fuel rod facing the control rod, so that the neutron energy is reduced and, if the fissionable Pu enrichment for each of the fuel rods in the assembly is made identical, a power peaking is generated to the fuel rods facing the control rod. Then, a fuel assembly in which the power distribution in the fuel assembly is flattened can be attained by varying the fissionable Pu enrichment in the assembly for several kinds in accordance with the distance from the insertion position of the control rod.

Further, the fourth object can be attained by the following functions. According to the studies of the present inventors, the power and flow rate of the fuel assembly can be flattened to improve the thermal margin by making the arrangement of the fuel assemblies and the orifice constitution appropriate in the reactor core. The infinite neutron multiplication factor in the outer reactor core region can be made higher than that in the inner region to flatten the radial power distribution by radially bisecting the region of the reactor core except for the outermost circumference into equal areas by loading the fuel assemblies such that the average value for the number of core staying cycles of the fuel assemblies in the outer reactor core region is made smaller than that in the inner reactor core region. Necessary reduction for the fissionable Pu enrichment can be attained by loading fuel assemblies of greater number of staying cycles in the outermost circumferential region of the reactor core at a low neutron importance. According to the studies of the present inventors, the effect of the neutron leakage from the outer circumferential portion of the reactor core is particularly remarkable in the fuel assembly at and adjacent to the outermost layer of the reactor core, to lower the power of the fuel assembly compared with that in other regions and increase the flow rate flowing in the fuel assembly. Accordingly, the distribution of the flow rate can be flattened by setting such that the average value for the orifice pressure loss coefficient of fuel assemblies at and adjacent to the outermost circumference of the reactor core is made greater than the average value for the orifice pressure loss coefficient in other regions. This can reduce the flow rate near the outermost circumference of the reactor core and reduce the flow rate over the entire reactor core. Further, the steam void fraction can be increased in the region where the orifice pressure loss coefficient is increased, thereby contributing to the improvement of the void coefficient and increase of the breeding ratio.

Further, the sixth object can be attained by the following functions. According to the studies of the present inventors, while the breeding ratio can be increased to 1.0 or more by cooling light water steams, development of a material having greater high temperature resistance than that used in the existent BWR is necessary since the steam temperature exceeds a saturation temperature, and radioactive nuclides such as corrosion products flow together with the steams out of the reactor core. In the present invention, since the steam weight ratio at the exit of the rector core is kept to 40% or less, by which the coolants keep a two phase flow state at the saturation temperature even upon power up caused by abnormal transient change, to maintain the saturation temperature, thereby enabling use of the same structural materials as those in the existent light water cooled reactor, and a reactor core at a breeding ratio of 1.0 or more can be attained while preventing incorporation of radioactive nuclides such as corrosion products in the steams sent to the turbine by the distillation function due to boiling in the rector core.

Further, the first and the seventh objects can be attained by the following functions. The present inventors, have studied embodiments regarding fuels comprising degraded uranium enriched with Pu generated as residues upon manufacture of enriched uranium used in the existent light water cooled reactors, intended for stable long time energy supply. If natural uranium or depleted uranium recovered from spent fuels are still present in a great amount as at the present situation, a reactor core having equal or higher performance with respect to the breeding ratio and the void coefficient as compared with the case of Pu-enriched degraded uranium can be attained by reducing the enrichment of the fissionable Pu by about 0.5 wt % or more as compared with a case of using degraded uranium, by enriching Pu to natural uranium, depleted uranium or low concentrated uranium (0.71 wt % –2.0 wt %) instead of degraded uranium.

Further, the eighth object can be attained by the following functions. According to the studies of the present inventors, long life radioactive nuclides are in an equilibrated state in the reactor, to reach a predetermined amount not only by enriching degraded uranium with Pu but also by recycling actinoid nuclides simultaneously. Accordingly, in the reactor according to the present invention, the amount of generation and the amount of annihilation are equilibrated for the actinoid nuclides to reduce the increment to zero thereby enabling to attain a nuclear reactor system capable of not only remarkably reducing the entire generation amount of the long half-life actinoid nuclides that particularly result in problems, among the radioactive wastes, and but also confining Pu-containing actinoid nuclides only within the nuclear reactor, reprocessing facility and fuel manufacturing facility.

Followings are effects of the present invention in accordance with above-mentioned features of the present invention.

According to the present invention, degraded uranium, natural uranium, depleted uranium or low concentrated uranium can be burnt under a catalyst-like effect of Pu by attaining a breeding ratio of about 1.0, or 1.0 or more using fuels formed by adding Pu to degraded uranium, natural uranium, depleted uranium or low concentrated uranium, thereby enabling to contribute to stable long time energy supply.

Further, since the effective water-to-fuel volume ratio of 0.1 to 0.6 is provided by the combination of the dense hexagonal fuel assembly or the square fuel assembly comprising fuels formed by adding Pu to degraded uranium, natural uranium, depleted uranium or low concentrated uranium, coolants at high void fraction of 45% to 70% and the cluster-type, Y-type or cruciform control rods, a breeding ratio of about 1.0, or 1.0 or more can be attained, thereby enabling to contribute to the stable long time energy supply.

Further, the Pu inventory can be decreased by obtaining the same power as that in ABWR now under construction using the pressure vessel of substantially identical diameter and a short fuel assembly providing the reactor core height of 40 to 140 cm, so that a number of reactors according to the present invention can be operated with Pu generated from spent fuels from light water cooled reactors, under restricted natural uranium deposits in the world, thereby enabling to contribute to the stable long time energy supply.

Further, since the diameter of the pressure vessel, the operation conditions such as power and the materials used are substantially identical with those in BWR now under operation, the power generation cost can be kept about to an identical level as that in existent BWR although the performance is greatly improved.

Further, since increase of the neutron leakage in the vertical direction of the reactor core and the swing of the power distribution in the vertical direction of the reactor core can be utilized effectively by using the short fuel assembly, the upper and lower two region fuel assembly and the axially inhomogeneous fuel assembly, a reactor core of negative void coefficient can be attained to provide the same extent of safety as in existent fuel once-through type light water cooled reactors.

Further, since the combination of the dense fuel assembly and the coolants at high void fraction can increase the ratio of neutrons in the resonance energy region, increase the Doppler effect and decrease the absolute value of the negative void coefficient, safety can be improved such as for the events of power up, pressurization, decrease of coolant void fraction.

Further, since the steam weight ratio of the coolants at the exit of the reactor core is kept to 40% or less, radioactive materials such as corrosion products accumulated in the reactor can be confined within the reactor by maintaining the distillation function due to boiling, thereby enabling to maintain the radioactive level on the side of the turbine to the same extent as that in BWR now under operation and remarkably reduce the radiation level over that in existent vapor cooled fast reactors in the existent concept for the breeding reactor.

Further, the reactor core comprising the hexagonal fuel assembly and the cluster type control rod inserted therein can increase the reactor core homogeneity and enhance the thermal margin.

Further, the reactor core comprising the hexagonal fuel assembly and the Y-type control rod inserted between the fuel assemblies can utilize the technique in existent BWR of inserting from the lower portion of the reactor core as it is.

Further, the reactor core comprising the square fuel assembly and the cruciform control rod inserted between the fuel assemblies can utilize the reactor core system in existent BWR as it is.

Further, in the hexagonal or eclipsed hexagonal fuel assembly or the square fuel assembly, constitution of multiple regions, particularly, 2 to 5 regions ranging from a region in the vicinity of the Y-type or cruciform control rod to a region apart from the control rod with 2 to 5 kinds of fuel rods having varied fissionable Pu enrichments can reduce the power peaking in the fuel assembly and enhance the thermal margin.

Further, increase of the reactor core power density from 100 to 300 kW/l can reduce the Pu inventory amount per unit power and increase the capacity of the power generation facilities of the present invention that can be operated for a predetermined Pu, thereby contributing to the stable long time energy supply.

Further, since the portion having the average enrichment of the fissionable Pu along the horizontal cross section of 6 w/o or more is between 40 to 140 cm in the axial direction of the fuel assembly, the Pu inventory amount per unit power is decreased, the capacity of the power generation facilities of the present invention that can be operated for predetermined Pu can be increased thereby contributing to the stable long time energy supply, as well as the neutron leakage effect in the direction of the reactor core height is increased when the amount of steams generating is increased to make the negative void coefficient greater and contribute to the safety.

Further, since the average value for the fissionable Pu enrichment in the lower half portion of the fuel assembly using blanket portions at both of upper and lower ends is lower than that in the upper half portion, the power distribution in the direction of the reactor core height is flattened to enhance the thermal margin, as well as the power distribution swings in the direction of the reactor core height upon increase of the steam generation amount, which makes the negative void reactivity coefficient greater to contribute to the safety.

Further, since portions having the fissionable Pu enrichment of 6 w/o or more are provided in the upper and the lower portions along the axial direction excluding the blanket portions at both of the upper and lower ends of the fuel assembly, and the fissionable Pu enrichment in a central region therebetween is reduced to 6% or less, the reactor power is increased, the negative void coefficient due to the swing of the power distribution in the vertical direction of the reactor core is increased when the steam amount in the reactor core is increased to improve the safety. Further, the neutron absorbing effect in the region near the axial center of the reactor core can increase the Pu inventory capable of being loaded to the reactor core to improve the function as the Pu storing reactor. Then, since the reactor core height is relatively increased and the entire length of the fuel rod is increased, the thermal margin relative to the maximum linear power density can also be improved.

Further, simultaneous recycling of Pu and uranium can increase the preventive effect regarding nuclear nondiffusion.

Further, simultaneous recycling of Pu, uranium and actinoid nuclides can provide balance between the amount of generation and annihilation of the actinoid nuclides to reduce the increment to zero, as well as long half-life actinoid nuclides that result in problems, particularly, among radioactive wastes, can be confined only within the reactor, reprocessing facility and fuel production facility to improve performance for environments.

BRIEF DESCRIPTION OF THE DRAWINGS

FIG. 9 is a distribution chart for the axial enrichment of the fuel assembly loaded in the reactor core shown in FIG. 1.

FIG. 13 is a distribution chart for the axial enrichment of the fuel assembly loaded in the reactor core shown in FIG. 12.

DESCRIPTION OF THE PREFERRED EMBODIMENTS

Embodiments of the present invention are explained in detail with reference to the drawings. The following embodiments are directed to reactor cores of 1,350,000 kW electric power grade but the scale of the power is not restricted only thereto. It is applicable also to other power scales by changing the number of fuel assemblies.

A first embodiment of the present invention will be explained with reference to FIG. 1 and FIG. 6 to FIG. 11.

Figure 1:
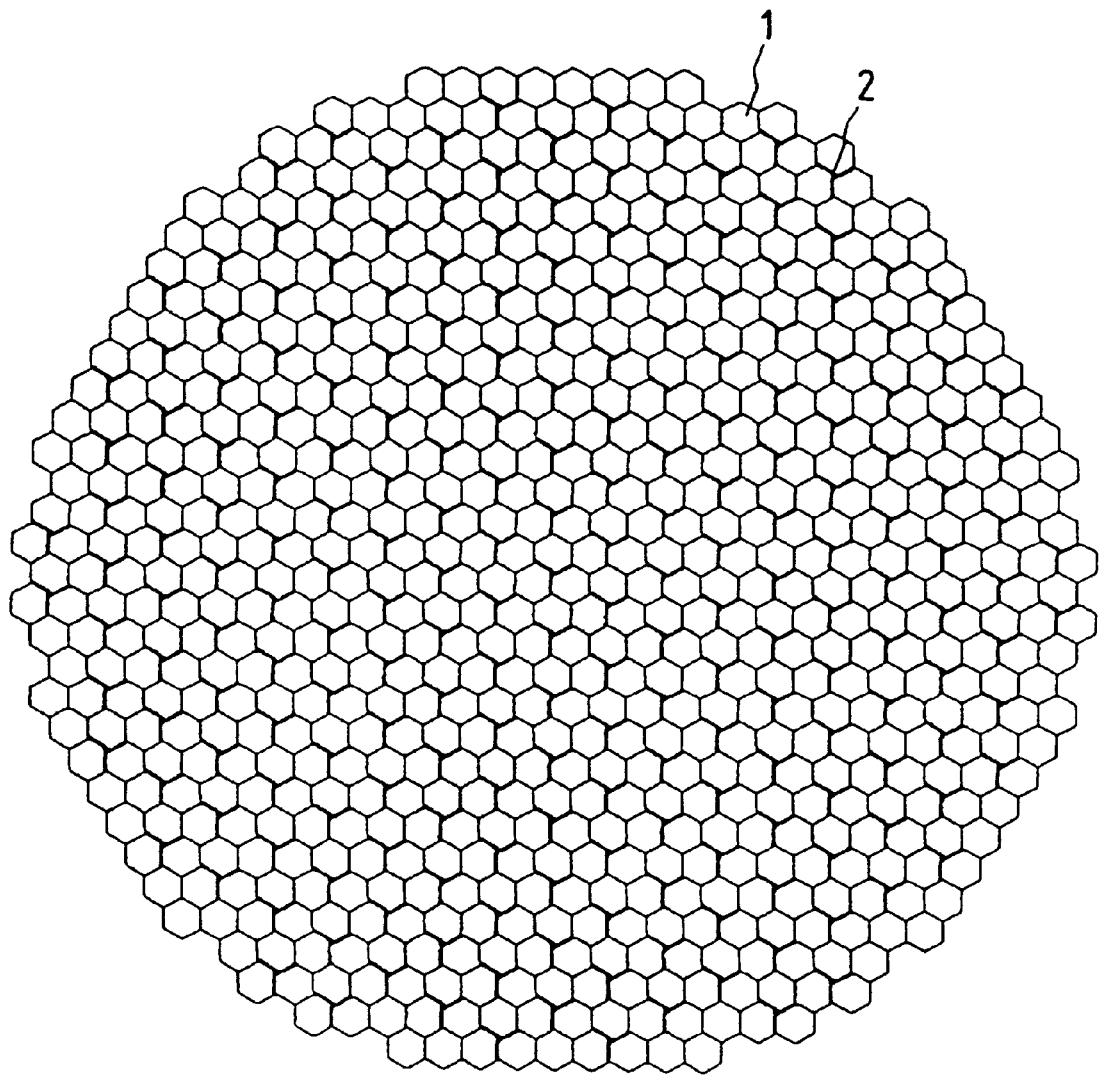
FIG. 1 is a horizontal cross sectional view of a reactor core in a first embodiment according to the present invention.
Figure 2:
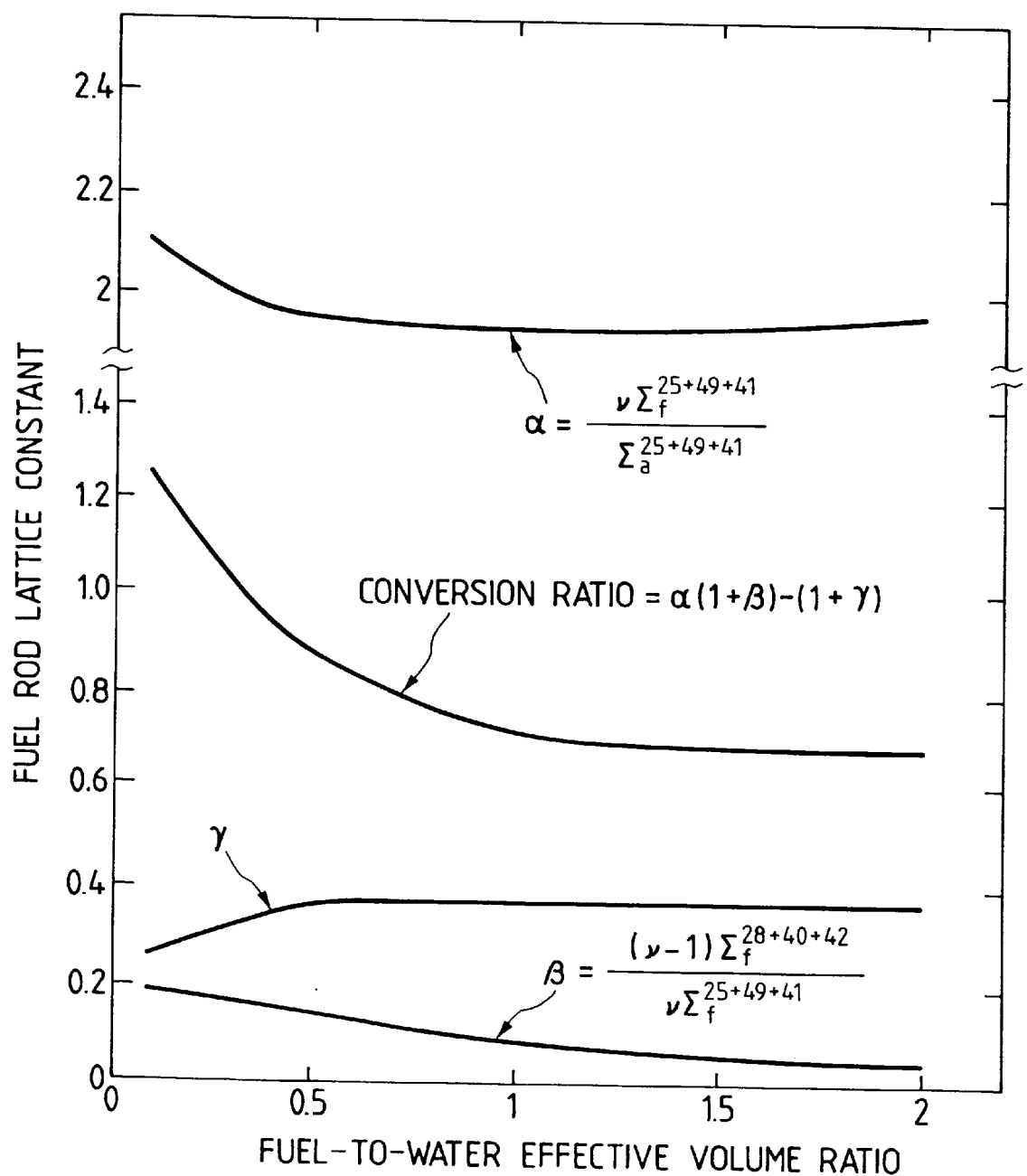
FIG. 2 is a characteristic graph representing a relationship between a fuel rod lattice constant and an effective water-to-fuel volume ratio required for representing the conversion ratio.
Figure 3:
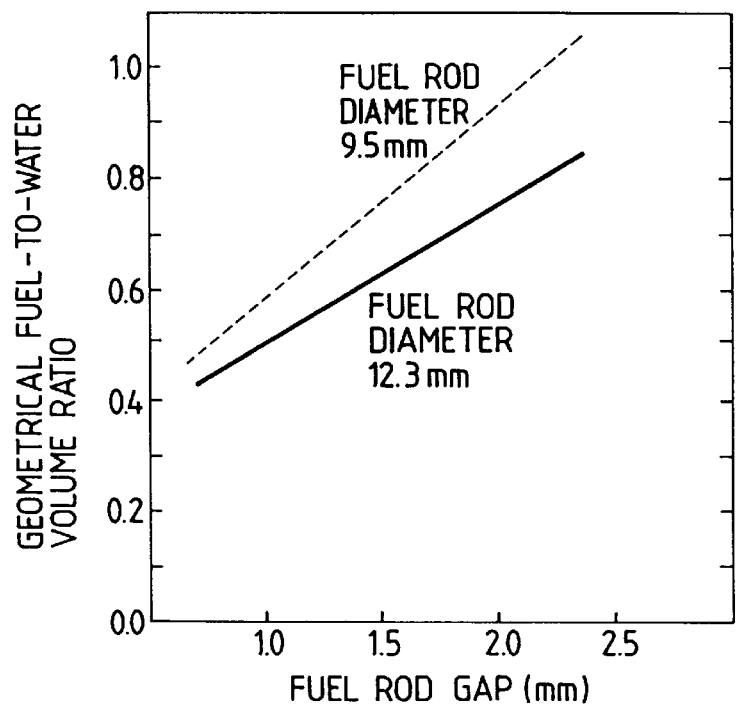
FIG. 3 is a characteristic graph representing a relationship between a fuel rod gap and a geometrical water-to-fuel volume ratio.
Figure 4:
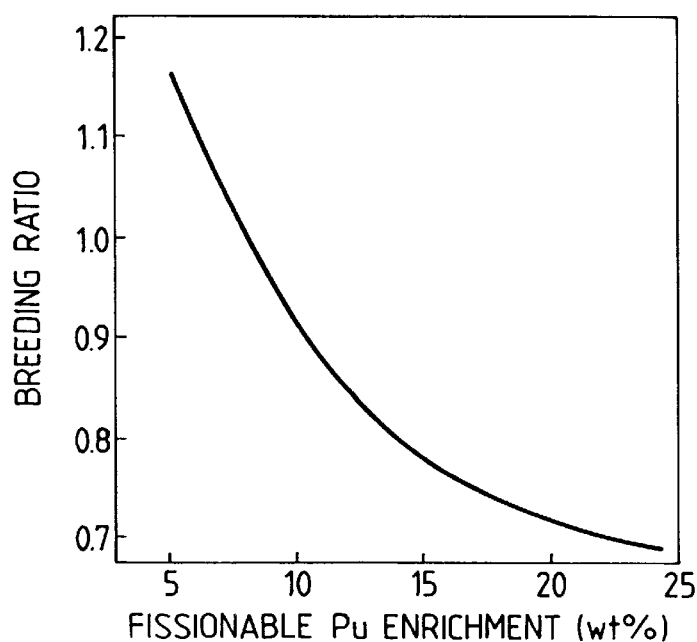
FIG. 4 is a characteristic graph representing a relationship between an enrichment of fissionable Pu and a breeding ratio.
Figure 5:
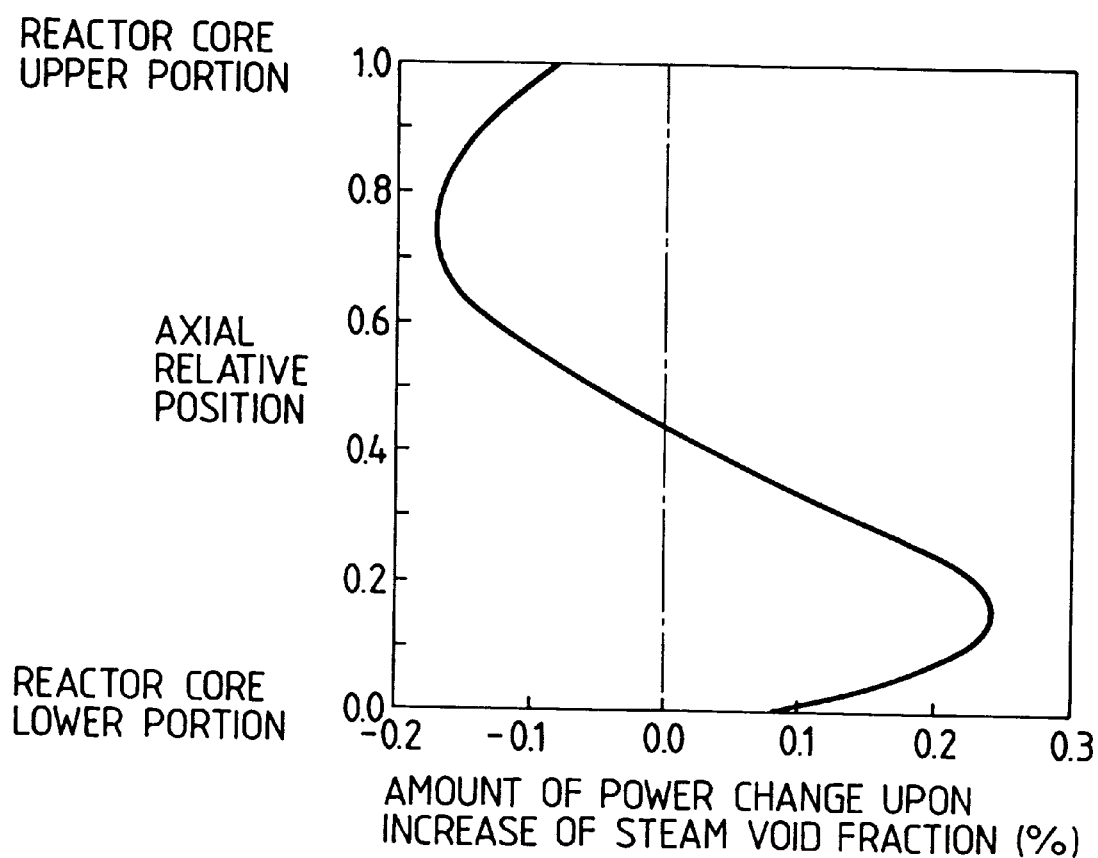
FIG. 5 is an explanatory view illustrating fluctuation of a power distribution upon increase of a steam void fraction.
Figure 6:
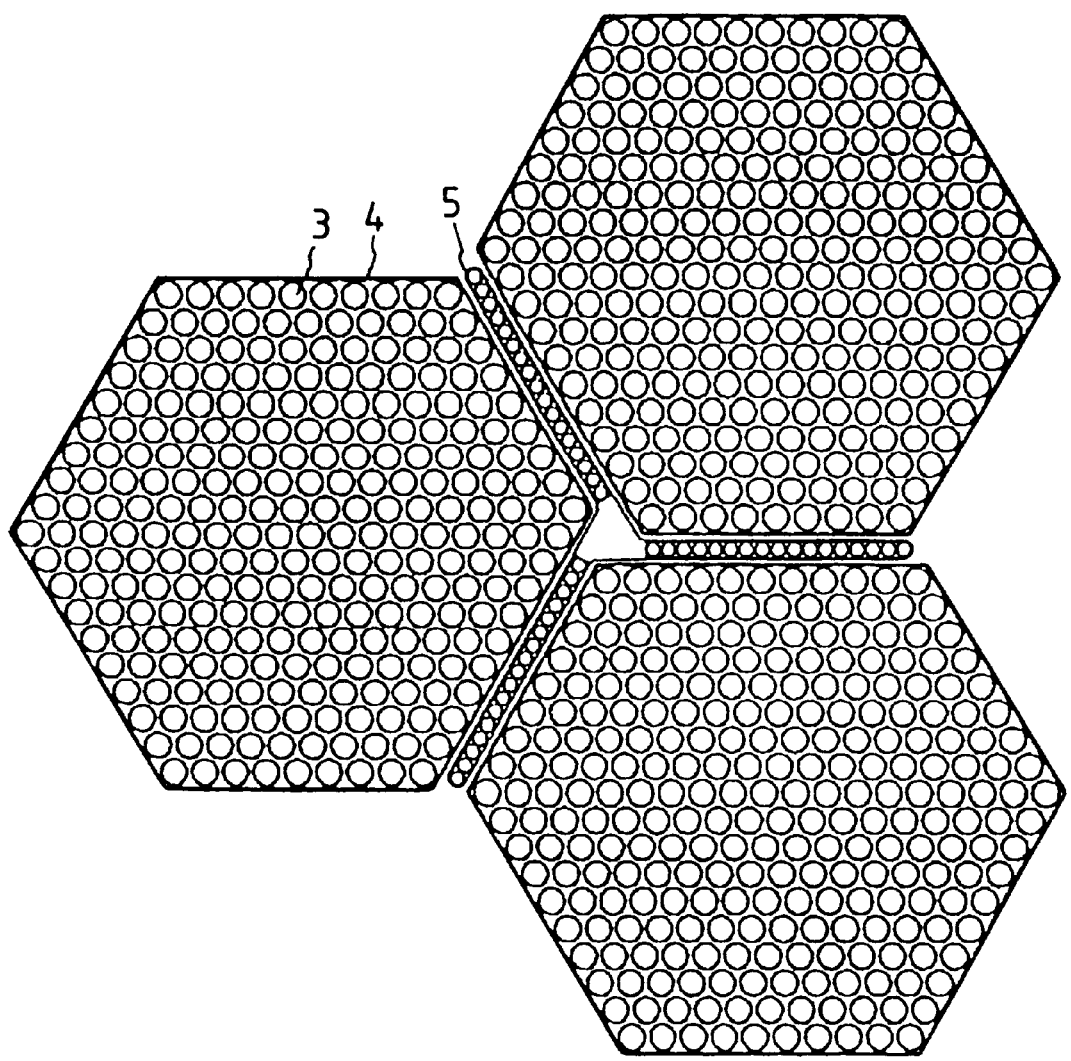
FIG. 6 is a horizontal cross sectional view of a fuel assembly loaded in the reactor core shown in FIG. 1.
Figure 7:
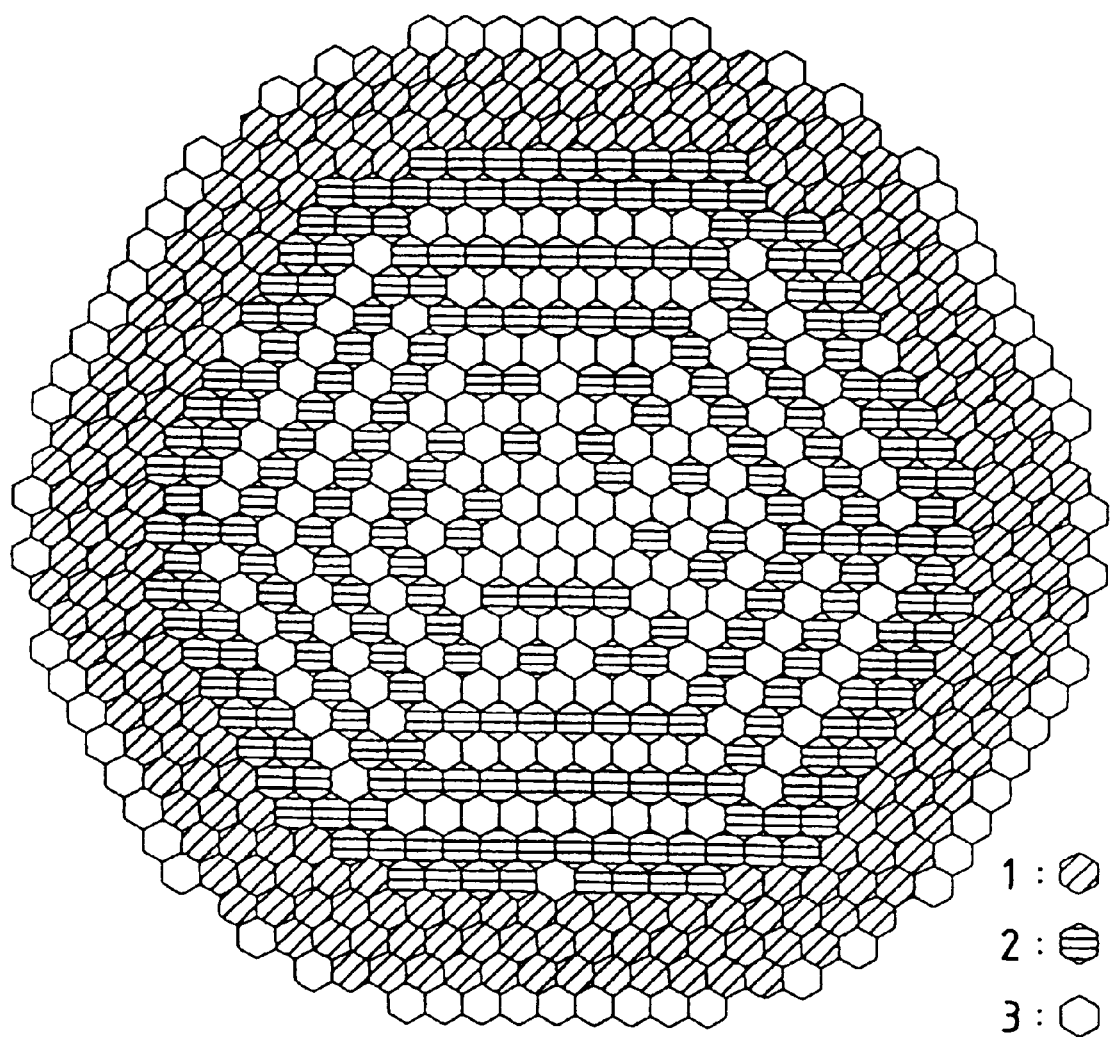
FIG. 7 is a view for the arrangement of fuel assemblies in a equilibrium reactor core in the embodiment shown in FIG. 1.
Figure 8:
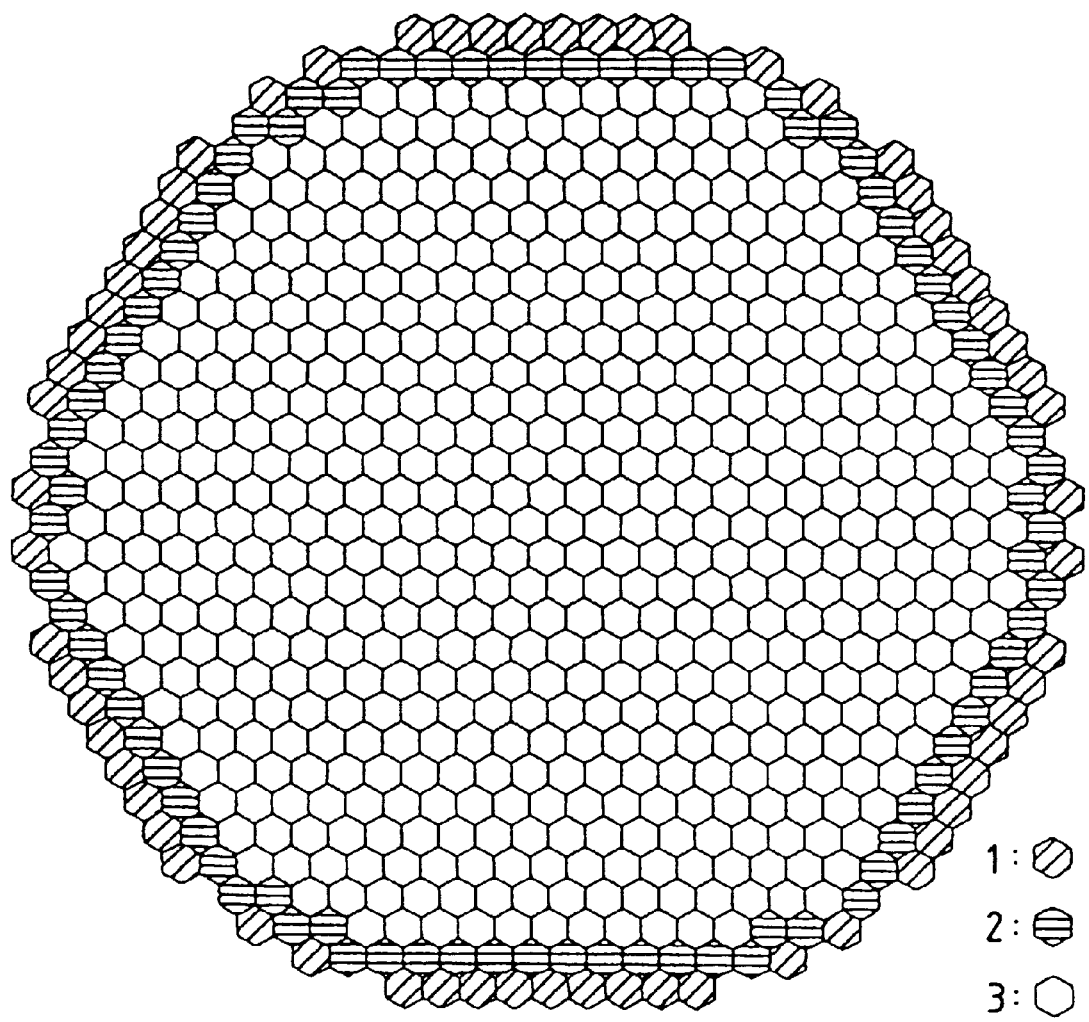
FIG. 8 is a distribution chart for orifice in the embodiment shown in FIG. 1.
Figure 10:
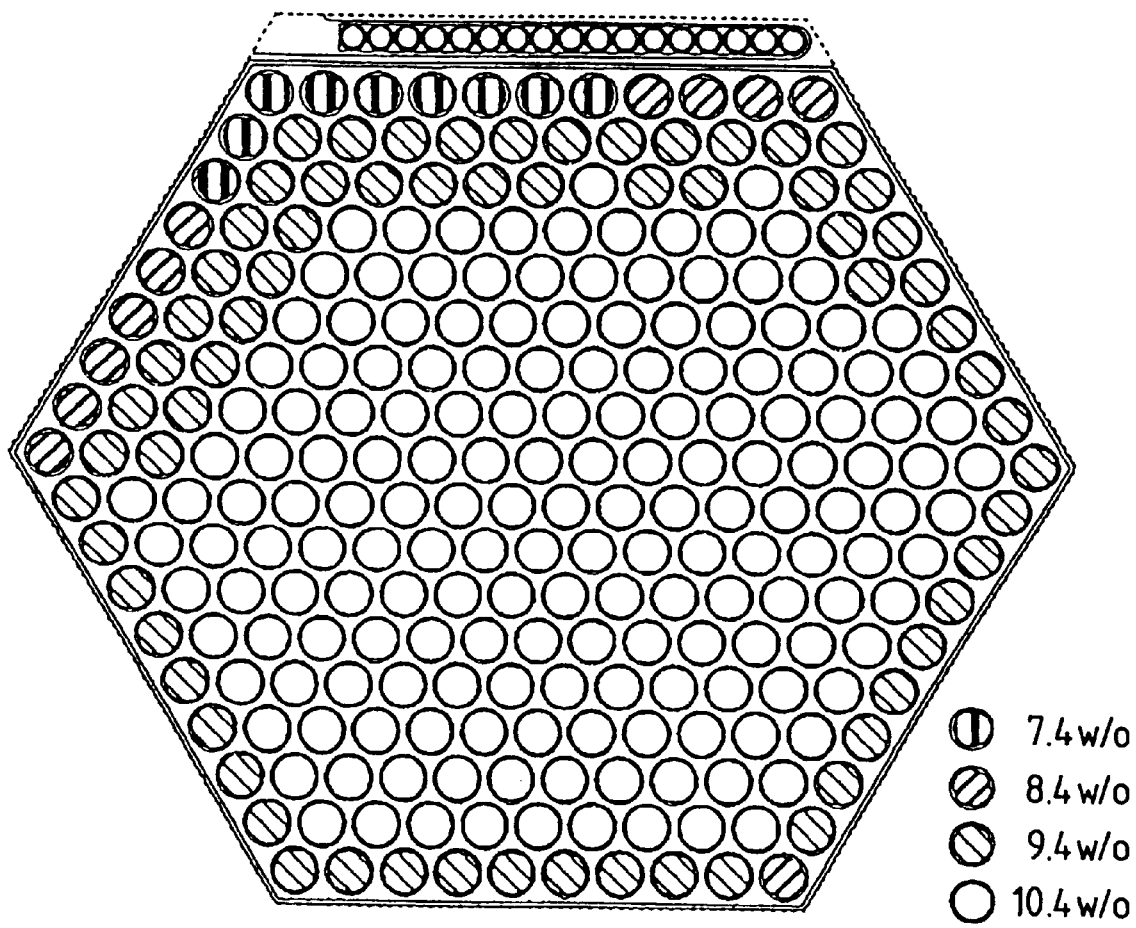
FIG. 10 is a distribution chart for the enrichment of fuel rods in the fuel assembly loaded in the reactor core shown in FIG. 1.
Figure 11:
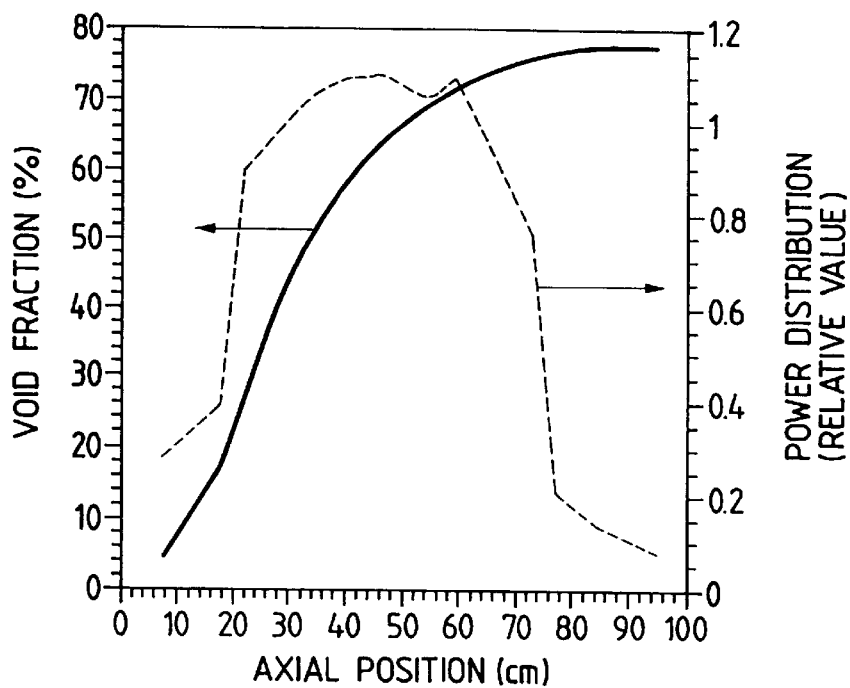
FIG. 11 is a characteristic chart illustrating the axial position of the reactor core and the void fraction distribution in the embodiment in FIG. 1.

FIG. 1 shows a horizontal cross section for 1356 MWe electric power in this embodiment. 720 fuel assemblies 1 and 223 Y-type control rods 2, each per three fuel assemblies are shown. FIG. 6 shows a cross section of a fuel assembly lattice. Fuel rods 3 each of 10.1 mm diameter are arranged in a regular triangular shape each at 1.3 mm fuel rod gap, and one row of fuel rods at the outermost circumference on one side of a regular hexagonal fuel assembly is not present so as to form a regular hexagonal fuel assembly lattice with a channel box 4 and one of wings 5 of the Y-type control rod. Namely, in the hexagonal fuel assembly, among three sets of fuel rod rows in parallel with the fuel rod rows of opposing outermost layers, two sets are equal with each other having 17 rows and the remaining one set has 16 rows. Stainless tubes filled with B4C are arranged in the wings of the control rod and wings are arranged each at a 120 degree spacing and so as to constitute a regular triangular shape with extensions from respective wings. Further, the control rod has at the top end a follower portion constituted with carbon which is a material having a smaller moderating function than light water. FIG. 7 shows a fuel arrangement for a equilibrium reactor core. The numbers indicated on the fuel assembly 1 show staying periods in the reactor core by the number of cycles. Fuels at the third cycle of the longest core staying period are loaded to the outermost circumference of the reactor core with low neutral importance. Fuels at the first cycle of the core staying period with the highest infinite medium neutron multiplication facter are loaded to the outer reactor core region at the inside thereof, to flatten the radial power distribution of the reactor core. In the inner reactor core, fuels at the second and the third cycle of the core staying period are loaded dispersively to flatten the power distribution in the inner region. FIG. 8 shows an orifice state in the equilibrium reactor core in which numbers indicated on the fuel assemblies 1 show that the opening/closing degree of the orifices disposed to a fuel support portion is different and they are divided into three regions. The orifice diameter of the outer reactor core region (numbers 1 and 2) of lower fuel assembly power is smaller than the orifice diameter of the inner region. FIG. 9 shows a distribution of the enrichment of fissionable Pu in the axial direction averaged along a horizontal cross section of fuel assemblies for the equilibrium reactor core. Pu-enriched uranium is degraded uranium. The height of the reactor core is 55 cm and it is divided into two regions at 8/12 from the lower end of the reactor core in which the enrichment in an upper portion is 12 wt % and that in an lower portion is 10 wt %. Degraded uranium blankets each of 25 cm and 20 cm are attached to upper and lower ends of the reactor core respectively. FIG. 10 shows a distribution of Pu-enrichment along a horizontal cross section in the lower portion of the fuel assembly. The fissionable Pu enrichment includes four kinds of 10.4 wt %, 9.4 wt %, 8.4 wt % and 7.4 wt %, with an average enrichment being 10 wt %. The distribution of the Pu enrichment along the horizontal cross section in the upper portion of the fuel assembly is identical with that in the lower portion, in which the fissionable Pu enrichment includes four kinds of 12.4 wt %, 11.4 wt %, 10.4 wt % and 9.4 wt %, with an average enrichment being 12 wt %. FIG. 11 shows a power distribution and a void fraction distribution averaged in the axial direction for the reactor core. The average reactor core void fraction is 61% and the steam weight ratio at the exit of the reactor core is 32 wt %.

The combination of the dense hexagonal fuel assembly comprising a regular triangular lattice with 1.3 mm fuel rod gap, an average reactor core void fraction of 61% and a Y-type control rod can provide an effective water-to-fuel volume ratio of 0.27 to attain an incore breeding ratio of 0.90, a blanket breeding ratio of 0.11 and a total breeding ratio of 1.01.

With the reasons as described above, a light water cooled reactor at a breeding ratio of 1.01 is achieved in this embodiment by decreasing an effective water-to-fuel volume ratio from about 2.0 as in the existent reactor to 0.27.

The power of this reactor core is 1,350,000 kWe which is identical with the power of existent ABWR, and the circumscribing radius of the reactor core is 2.8 m which is substantially equal to the value for ABWR. The reactor core has a 55 cm height and has blankets of 25 cm and 20 cm attached to upper and lower ends respectively to constitute a short fuel assembly. However, since the fuel rods are arranged densely, the entire length of the fuel rod is substantially equal to that in ABWR, and MCPR is 1.32 which can sufficiently satisfy the standard thermal design value of 1.24. Since this is constituted as a short fuel of 55 cm for the reactor core portion irrespective of the dense arrangement, Pu inventory is as small as 4.4 toil being converted as the amount of fissionable Pu per 1,000,000 kWe power and it is 10 ton or less per 1,000,000 kWe even considering the outer core staying period of Pu such as in reprocessing.

With the reasons described above, according to this embodiment at a breeding ratio of 1.01, 1,500 units of 1,000,000 kWe reactors can be operated continuously for 10,000 years using 15,000 tons of fissionable Pu and 15,000,000 tons of degraded uranium resulting from 15,000,000 tons of uranium deposits in the world, to attain a stable long time energy supply system.

In this embodiment, identical power with that of ABWR under construction can be attained by a pressure vessel of a size substantially equal thereto and an identical burnup degree of 45 GWd/t with that in ABWR can also be attained by using identical zircalloy for the fuel cladding material.

With the reasons described above, this embodiment can attain BWR capable of coping with stable long time energy supply at a substantially equal power generation cost to that in fuel once-through type light water cooled reactors under operation at present.

While the height of the reactor core is about 370 cm in BWR under operation, it is 55 cm in this embodiment. Accordingly, it has a large neutron leakage effect of rendering the void efficient negative that represents increase of reactivity when the amount of steams generated in the reactor core is increased. Further, it comprises two upper and lower region fuels in which the fissionable Pu enrichment is different at 18.3 cm from the upper end in the axial direction of the fuel assembly in which the enrichment in the upper portion is 12 wt % and the enrichment in the lower portion is 10 wt %. Further, when the void amount in the reactor core is increased, the relative increment of the void fraction is greater by about 20% in the lower portion of the reactor core where the void fraction is low than in the upper portion of the reactor core which has already reached the saturation state, and, as a result, a neutron flux distribution swings from the upper portion of the reactor core of high neutron importance to the lower portion of the reactor core of low neutron importance to charge a negative void reactivity. Further, in this embodiment, since the steam weight ratio at the exit of the reactor core is 32%, entire coolants are not converted into steams even upon abnormal transient change but always kept in a two phase flow state, to confine radioactive materials such as corrosion products accumulated in the reactor core within the reactor core under the distillation effect by boiling, and prevent them from transferring to a turbine, like that in the existent BWR.

With the reasons described above, this embodiment can achieve BWR capable of coping with stable long time energy supply under the same extent of safety as that of the fuel once-through type light water cooled reactors now under operation.

In BWR under operation, about 85% of nuclear reactions occurs in a thermal neutron region at 0.6 eV or less, whereas the central energy value caused from nuclear reactions in this embodiment is about 1 keV, and the reaction ratio in the resonance region is extremely high. Therefore, while BWR now under operation has a Doppler coefficient of 1.6×10−5 $\Delta k/k/°$ C., the value in this embodiment is 3.7×10−5 $\Delta k/k/°$ C. which is about twice.

The existent BWR now under operation has a void coefficient of −7.0×10−4 $\Delta k/k/\%$ void, whereas an absolute value in this embodiment is set as low as −0.5×10−4 $\Delta k/k/\%$ void. As a result, a thermal margin is relatively increased, for this embodiment, in an event of pressure elevation or temperature lowering of coolants.

For the reasons described above, this embodiment can provide a BWR reactor core of greater safety margin for most of transient events than existent BWR now under operation.

According to this embodiment, the breeding ratio at 1.01 can be attained by the combination of the dense hexagonal fuel assembly, the Y-type control rod and the average reactor core void fraction of 61%, using fuels comprising degraded uranium enriched with fissionable Pu of 10.5 wt % in average, and the Pu inventory is also reduced by making the reactor core height to 55 cm, so that stable long time energy supply can be attained by BWR capable of operating 1,500 units of 1,000,000 kW reactors for 10,000 years, with 15,000,000 tons of natural uranium deposits in the world. In addition, since the diameter of the pressure vessel, operation conditions such as power and the materials to be used are made substantially equal to those of BWR now under operation, the power generation cost can be suppressed about to the same extent as that for the existent BWR, with the performance being improved remarkably. Further, since the negative void coefficient is maintained by means of the short fuel assembly and two upper and lower region fuel assemblies and the steam weight ratio is kept to about 30% at the exit of the reactor core, a distillation function by boiling can be maintained to confine radioactivated materials within a pressure vessel, so that about the same extent of safety margin as that for the existent BWR can be obtained.

In this embodiment, descriptions have been made as to the constitution, the function and the effect to fuels obtained by enriching Pu to degraded uranium produced as residues upon production of concentrated uranium used in existent light water cooled reactors, intended for stable long time energy supply. However, an equivalent or superior effect can be obtained also with fuels formed by enriching Pu to natural uranium, depleted uranium recovered from spent fuels and low concentrated uranium instead of degraded uranium. In this instance, enrichment of the fissionable Pu can be lowered by 0.5 wt % or more as compared with the case of using degraded uranium, by the increase of the weight ratio of uranium-235 contained in the fuels. As a result, a breeding ratio to the fissionable Pu can be increased by about 3% or more and the void coefficient can be made further negative. Further, since the Pu inventory can be reduced, the number of RBWR reactor units to be operated can be increased further.

The void coefficient is negative in this embodiment but the power coefficient including a Doppler coefficient can be made negative even if the void efficient is zero or slightly positive. Studies made by the present inventors, show that the positivity or negativity of the void coefficient causes no substantial problem so long as the power coefficient is negative from the result for the safety evaluation. Accordingly, the thermal margin can further be increased by making the reactor core portion longer than 55 cm. Further, the breeding ratio can be increased by narrowing the fuel rod gap to less than 1.3 mm.

In this embodiment, descriptions have been made to fuels in which uranium is enriched only with Pu but other actinoid nuclides may also be enriched together with Pu. In this instance, since the neutron average energy is high in RBWR, Pu less transfers to actinoid nuclides of high mass number, as well as the actinoid nuclides can be annihilated by nuclear reactions.

Figure 28:
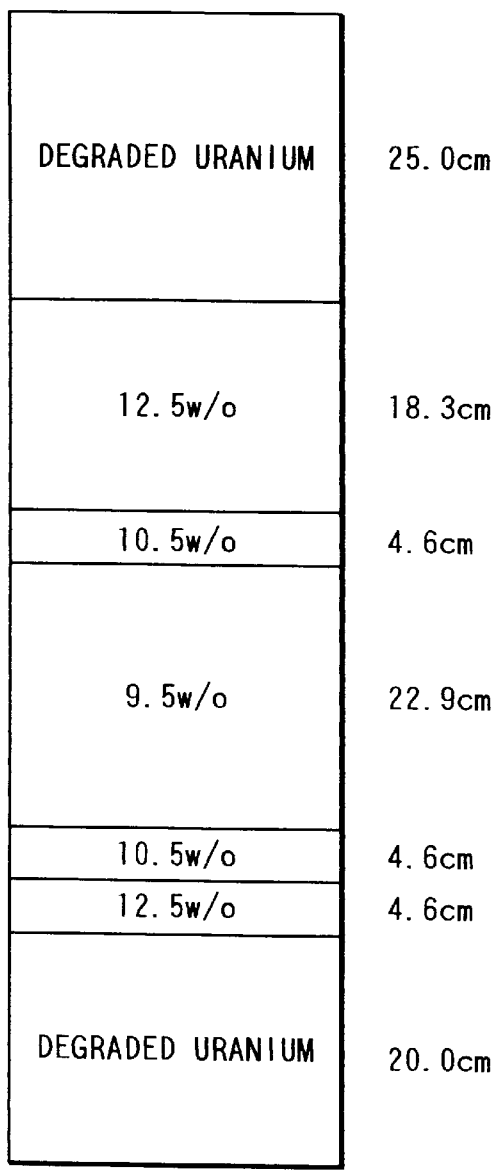
FIG. 28 is a modification embodiment of the axial enrichment distribution of the fuel assembly loaded in the reactor core shown in FIG. 1.
Figure 30:
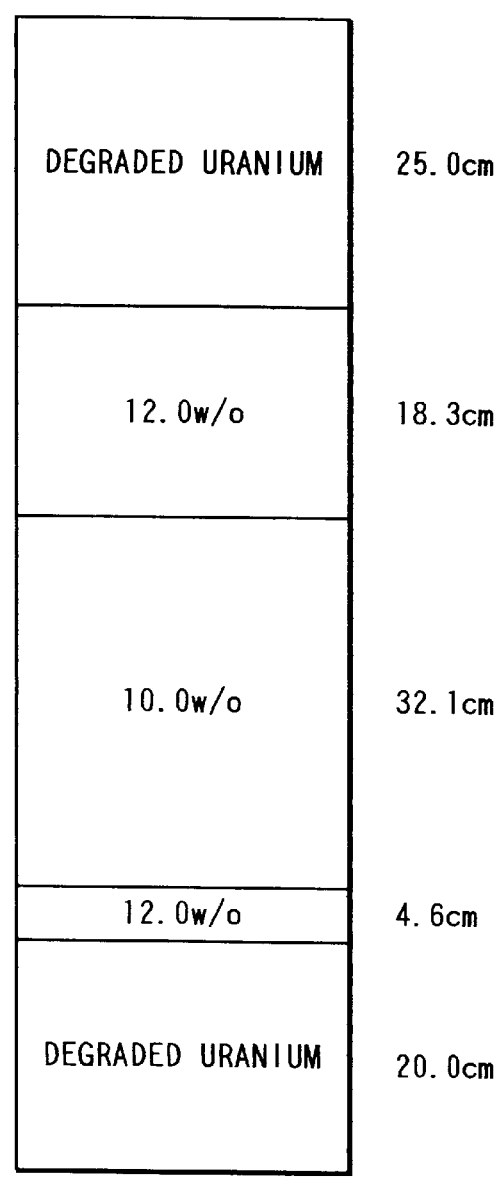
FIG. 30 is a modification embodiment of the axial enrichment distribution of the fuel assembly loaded in the reactor core shown in FIG. 1.
Figure 29:
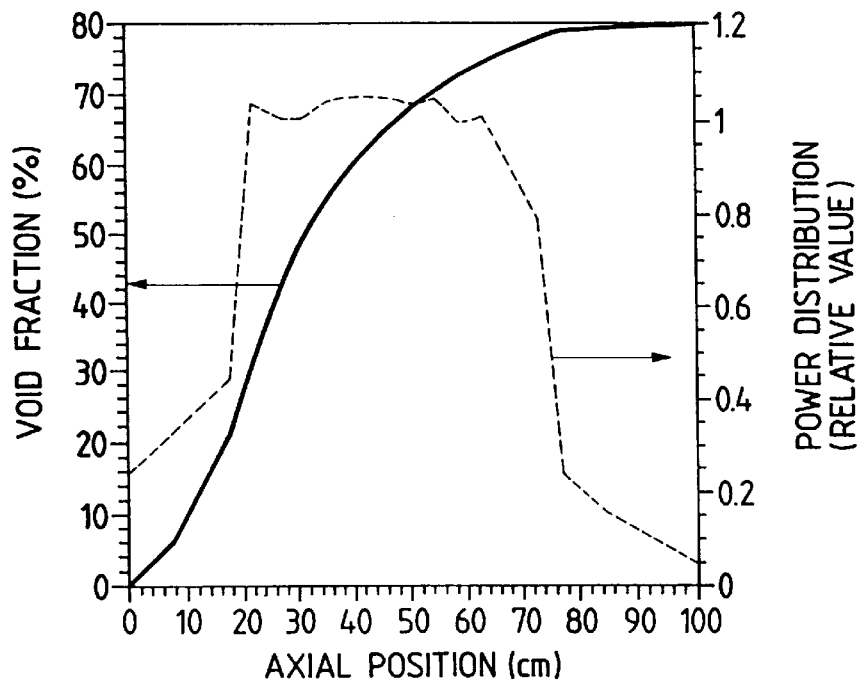
FIG. 29 is a characteristic chart illustrating an axial position and a void fraction distribution of the reactor core loaded with FIG. 28.

Further, although the fissionable Pu enrichment is divided into upper and lower regions at 8/12 from the lower end of the reactor core, this is not limitative. FIG. 28 shows an embodiment of a distribution in the axial direction for the fissionable Pu average enrichment along a horizontal cross section. Pu-enriched uranium is the same degraded uranium as in this embodiment, and degraded uranium blankets each of 25 cm and 20 cm are attached to upper and lower portions of the reactor core respectively. The reactor core height is 55 cm which is identical with that in this embodiment and it is divided into five regions at 1/12, 2/12, 7/12 and 8/12 from the lower end of the reactor core. The fissionable Pu enrichment is 12.5 wt %, 10.5 wt %, 9.5 w %, 10.5 wt % and 12.5 wt % from the upper portion, the fissionable Pu average enrichment for the fuel assembly is 11 wt %, the average enrichment in the upper half portion is 11.7% and the average enrichment in the lower half portion is 10.2 wt %. As shown in FIG. 29, the axial power distribution can be flattened further by increasing the fissionable Pu enrichment in the region near the lower end and disposing an intermediate enrichment (10.5 wt %) between the highest enrichment (12.5 wt %) and the lowest enrichment (9.5 wt %). In the embodiment shown in FIG. 28, the power peaking can be reduced further by 5% as compared with this embodiment. Further, for the axial direction of the fuel assembly, the average fissionable Pu enrichment in the upper half portion is higher than the average value for the lower half portion and an effect of reducing the void reactivity coefficient can be obtained like that in this embodiment. Further, since the axial power distribution is flattened, the amount of neutron leakage from the upper and the lower portions of the reactor core is increased. This increases the required fissionable Pu enrichment to greater than that in this embodiment, but it can provide an effect of further reducing the void reactivity coefficient. FIG. 30 shows a modification of FIG. 28 in which the intermediate enrichment (10.5 wt %) is saved. The embodiment in FIG. 28 has a greater effect for the flattening of the power distribution and the same effect can be obtained by two kinds of fissionable Pu enrichments like that in this embodiment.

Figure 19:
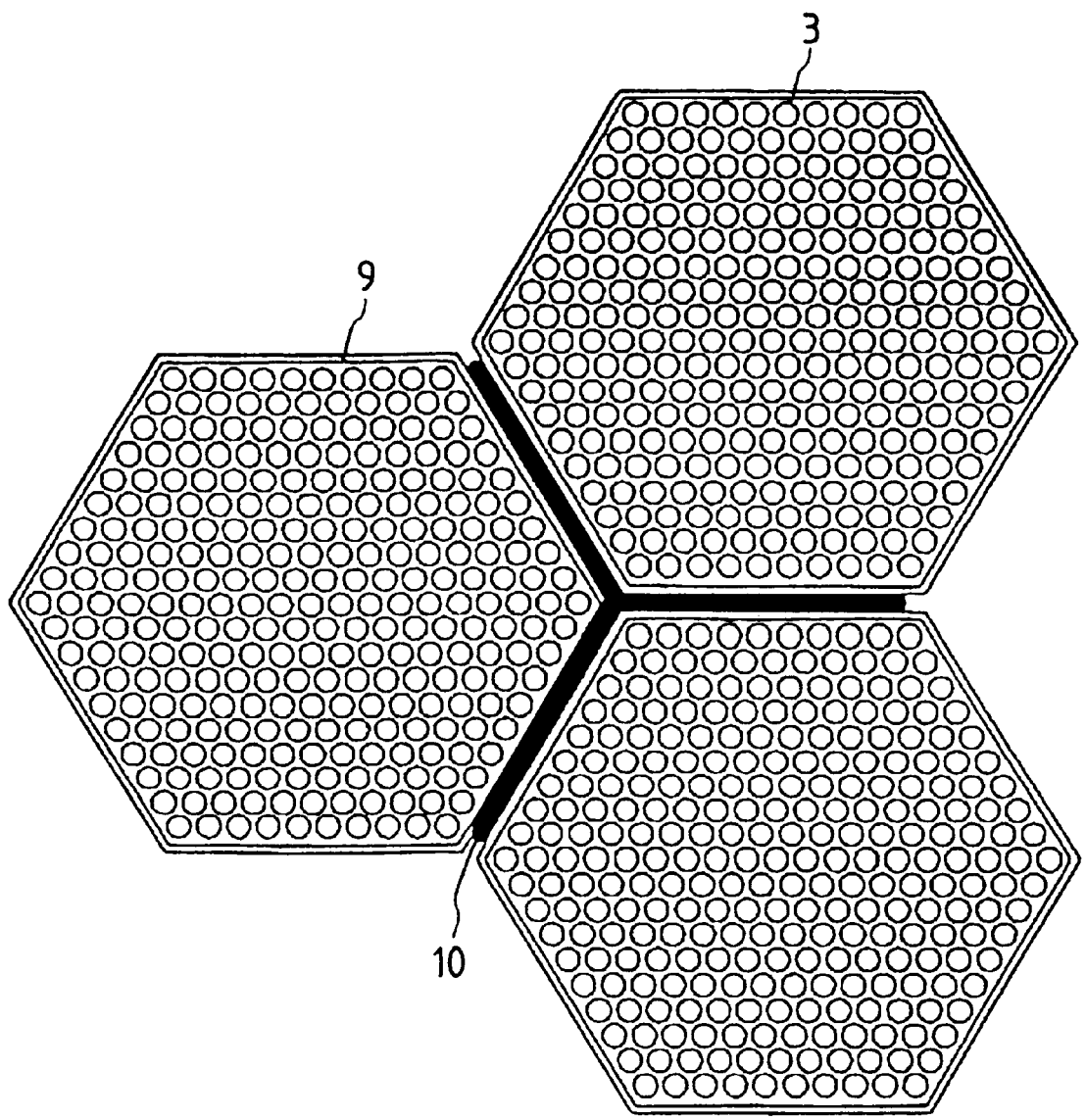
FIG. 19 is a horizontal cross sectional view of fuel assemblies loaded in the reactor core shown in FIG. 18.
Figure 20:
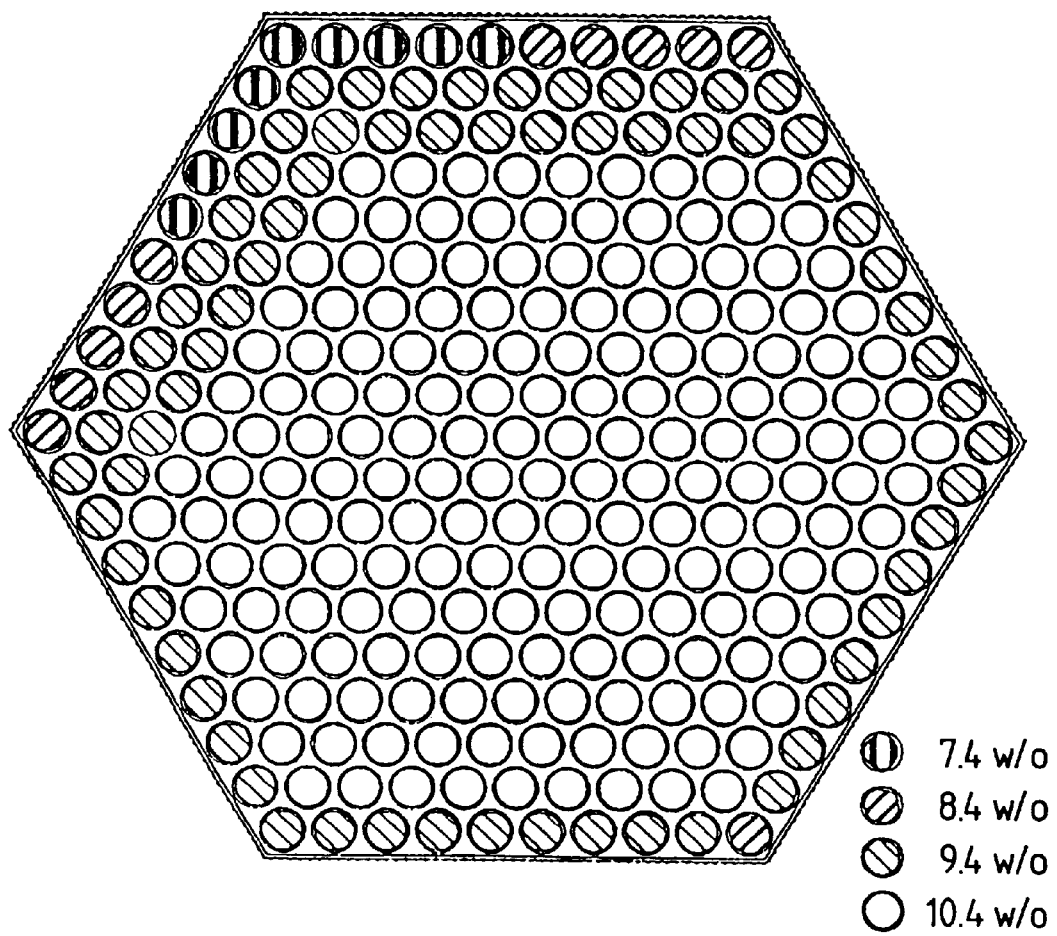
FIG. 20 is a distribution chart for the enrichment of fuel rods in the fuel assembly loaded in the reactor core shown in FIG. 18.

Description will be made to the second embodiment according to the present invention with reference to, FIGS. 18 to 20.

Figure 18:
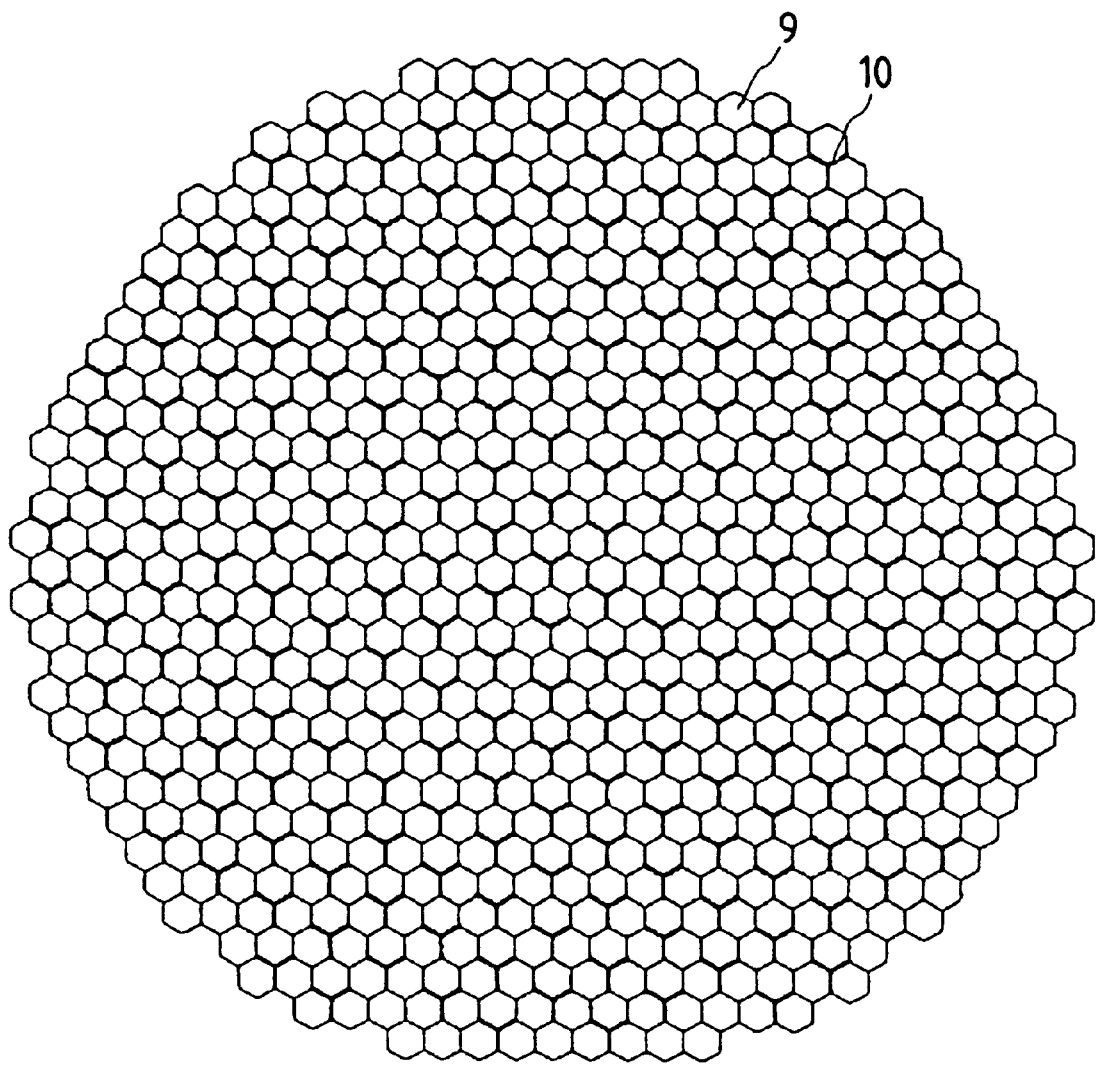
FIG. 18 is a horizontal cross sectional view of a reactor core in a second embodiment according to the present invention.

FIG. 18 shows a horizontal cross section of a reactor core of 1356 MWe electric power of this embodiment. 720 fuel assemblies 9 and 223 Y-type control rods 10 each per three fuel assemblies are shown. FIG. 19 shows a cross section of a fuel assembly lattice. Fuel rods 3 each of 10.1 mm diameter are arranged in a regular triangular shape at 1.3 mm fuel rod gap to constitute a regular hexagonal fuel assembly of 10 rows of fuel rods. Then, Y-type control rods each per three fuel assemblies 3 are arranged as shown in FIG. 18 and a gap between each of the fuel assemblies not inserted with the control rod is made narrower than a gap between each of the fuel assemblies inserted with the control rod. Stainless tubes filled with B4C are disposed to the wings of the control rod and the wings are spaced each by 120 degree. Further, the control rod has at the top end a follower portion constituted of carbon which is a substance of smaller moderating function than that of light water. The arrangement of fuels in the reactor core, the state of the orifice and the distribution of the fissionable Pu enrichment in the axial direction averaged along the horizontal cross section of the fuel assembly for the equilibrium reactor core are identical with those shown in FIG. 7, FIG. 8 and FIG. 9 for Embodiment 1. FIG. 20 shows the distribution of the fissionable Pu enrichment along the horizontal cross section in the lower portion of the fuel assembly. The distribution of the fissionable Pu enrichment is symmetrical with respect to one of the wings of the Y-type control rod not adjacent to the regular hexagonal fuel assembly. The fissionable Pu enrichment comprises four kinds of 10.4 wt %, 9.4 wt %, 8.4 wt % and 7.4 wt %, with the average enrichment being 10 wt %. The distribution of the fissionable Pu enrichment along the horizontal cross section in the upper portion of the fuel assembly is identical with the distribution in the lower portion, and the fissionable Pu enrichment includes four kinds of 12.4 wt %, 11.4 wt %, 10.4 wt % and 9.4 wt %, with the average enrichment being 12 wt %.

In this embodiment, the fuel assembly is in a regular hexagonal shape, the number of fuel rods per fuel assembly is increased by 10 as compared with that in Embodiment 1 and the thermal margin is improved since the average linear power density is reduced and the heat conduction area is increased. On the other hand, since a space of the Y-type control rod is increased to the outside of the fuel assembly, the circumscribing radius of the reactor core is increased to greater than that in Embodiment 1. Also in this embodiment, the combination of the dense hexagonal fuel assembly, the Y-type control rod and the average reactor core void fraction of 61% can attain an effective water-to-fuel volume ratio of 0.27. As a result, the reactor core property is equal to that in Embodiment 1 and can provide a similar effect.

Further, also in this embodiment, an equal or superior effect can be obtained also with fuels formed by enriching Pu to natural uranium, depleted uranium recovered from spent fuels and low concentrated uranium instead of degraded uranium. Further, other actinoid nuclides can also be enriched together with Pu.

Further, in this embodiment, the fissionable Pu enrichment is divided into upper and lower two regions at 8/12 from the lower end of the reactor core but it is not restrictive. The same effect as that in Embodiment 1 can be obtained by adopting FIG. 28 or FIG. 30 as a modification of Embodiment 1.

Figure 16:
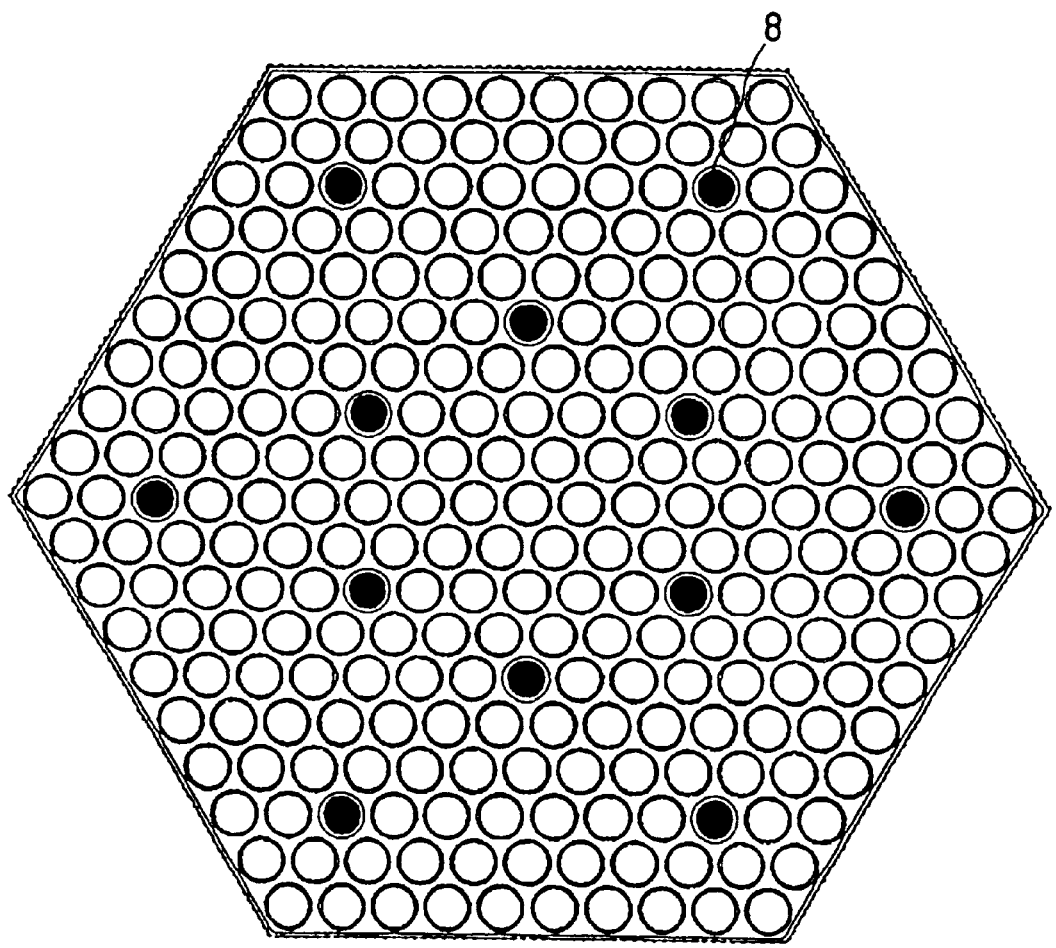
FIG. 16 is a horizontal cross sectional view of the fuel assembly loaded in the reactor core shown in FIG. 15.
Figure 17:
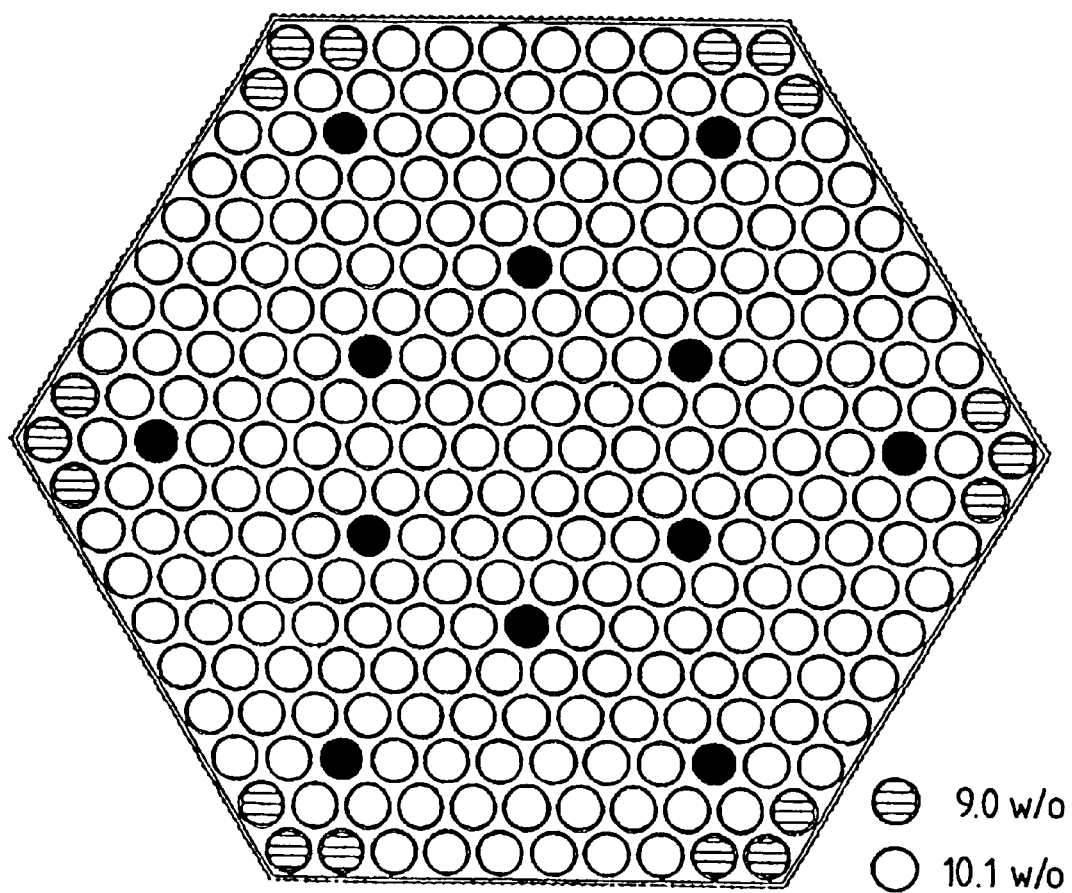
FIG. 17 is a distribution chart for the enrichment of fuel rods in the fuel assembly loaded in the reactor core shown in FIG. 15.

A third embodiment according to the present invention will be explained with reference to FIG. 15 to FIG. 17.

Figure 15:
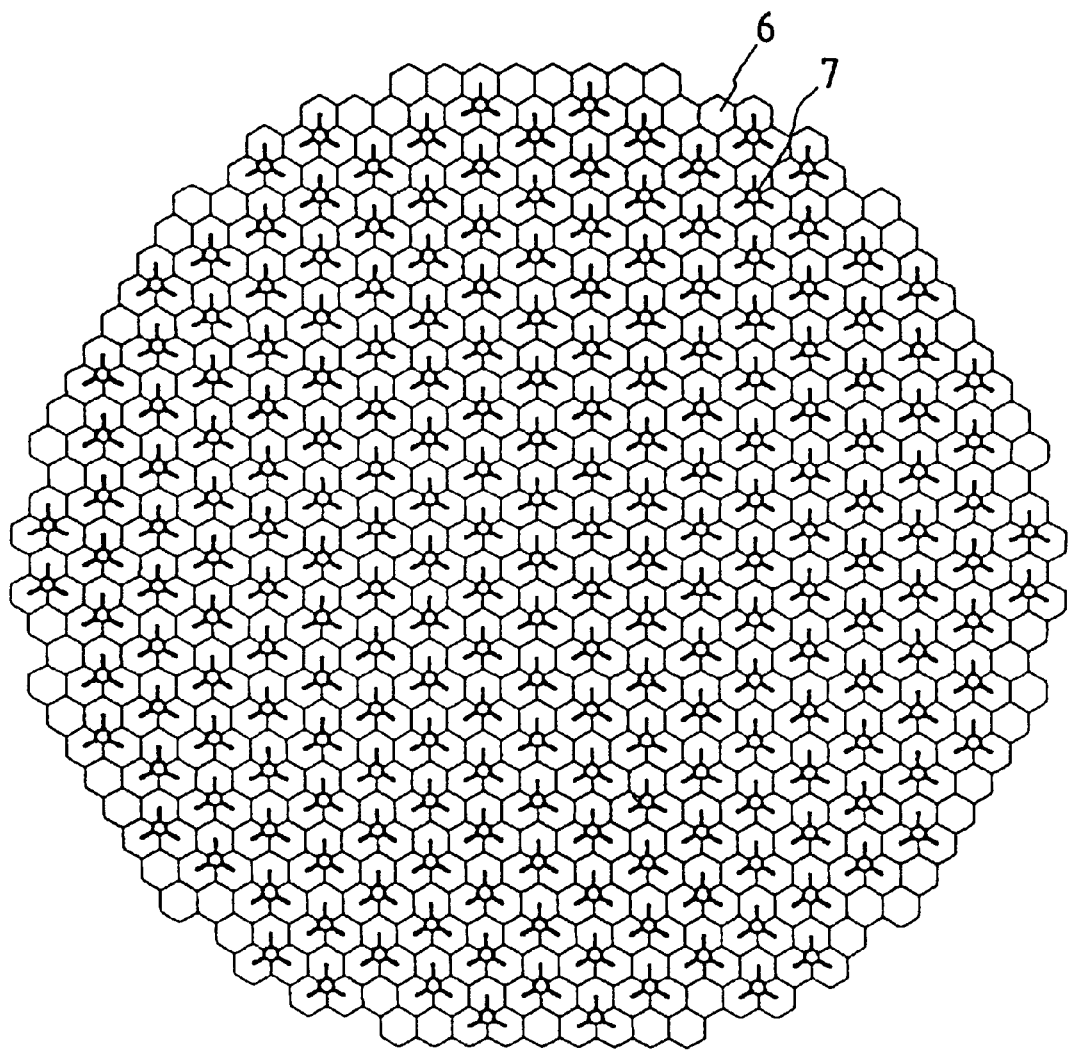
FIG. 15 is a horizontal cross sectional view of a reactor core in a third embodiment according to the present invention.

FIG. 15 shows a horizontal cross section of a reactor core of 1356 MWe electric power in this embodiment. There are shown 720 regular hexagonal fuel assemblies 6 and 223 control rod driving mechanisms 7 each for operating cluster-type control rods each to be inserted into per three fuel assemblies. FIG. 16 shows a horizontal cross section of a fuel assembly lattice. Fuel rods 3 each of 10.1 mm diameter are arranged in a regular triangular shape at 1.3 mm fuel rod gap to constitute a regular hexagonal assembly comprising 10 rows of fuel rods. Among them, guide tubes 8 for housing the cluster-type control rods are arranged at 12 positions in the fuel rod lattice. The arrangement of the fuels in the reactor core, the state of the orifice and the distribution of the fissionable Pu enrichment in the axial direction averaged along the horizontal cross section of the fuel assembly for the equilibrium reactor core are identical with those in FIG. 7, FIG. 8 and FIG. 9 for Embodiment 1. FIG. 17 shows the distribution of fissionable Pu enrichment along the horizontal cross section of the lower portion in the fuel assembly. Since the distribution of the moderators is more homogeneous than in Embodiments 1 and 2, power peaking can be suppressed by two kinds of the fissionable Pu enrichment. The fissionable Pu enrichment in fuel rods 1 and 2 are 9.0 wt % and 10.1 wt %, respectively. The distribution of the fissionable Pu enrichment along the horizontal cross section is identical between the upper portion and the lower portion in the fuel assembly, and the fissionable Pu enrichment in the fuel rods 1 and 2 are 11.0 wt % and 12.1 wt % respectively.

In this embodiment, since the control rod is inserted in the fuel assembly, the number of the fuel rods is decreased by two as compared with Embodiment 1 but a greater effect for reactivity control can be obtained and necessary reactivity can be controlled also by using natural boron as the absorbent.

Also in this embodiment, the combination of the dense hexagonal fuel assembly, the cluster-type control rod and the average reactor core void fraction of 61% can provide an effective water-to-fuel volume ratio of 0.27. As a result, the reactor core property is equal to that in Embodiment 1 and the same effect can be obtained.

Further, also in this embodiment, the equal or superior effect can be obtained also with fuels formed by enriching Pu to natural uranium, depleted uranium recovered from spent fuels and low concentrated uranium instead of degraded uranium. Further, other actinoid nuclides can be enriched together with Pu.

Further, in this embodiment, the fissionable Pu enrichment is divided into the upper and lower regions at 8/12 from the lower end of the reactor core but it is not limitative. The same effect as that in Embodiment 1 can be obtained by adopting FIG. 28 or FIG. 30 as a modification of Embodiment 1.

[Fourth Embodiment]

Figure 14:
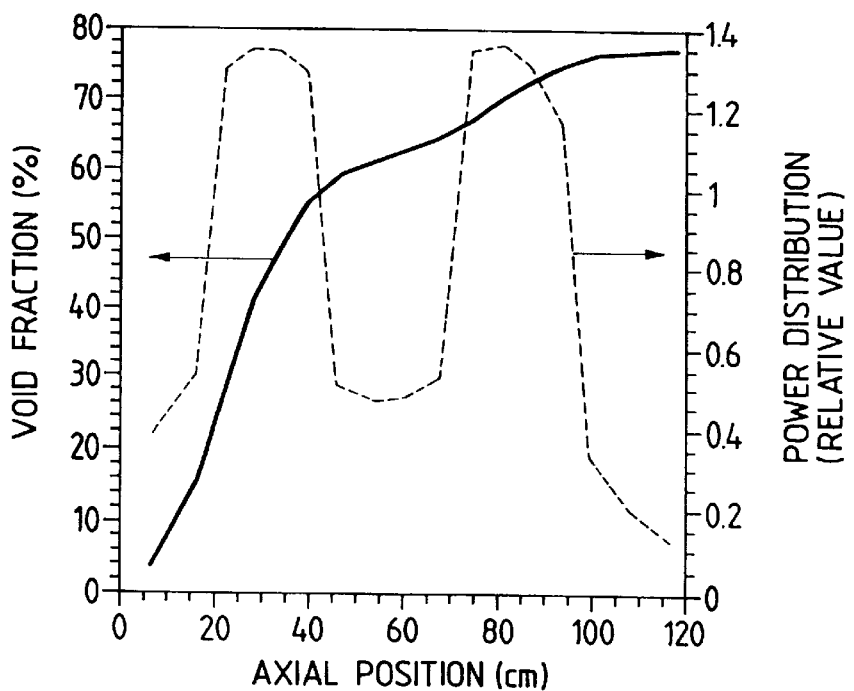
FIG. 14 is a characteristic chart illustrating the axial position of the reactor core and the void fraction distribution in the embodiment in FIG. 12.
Figure 12:
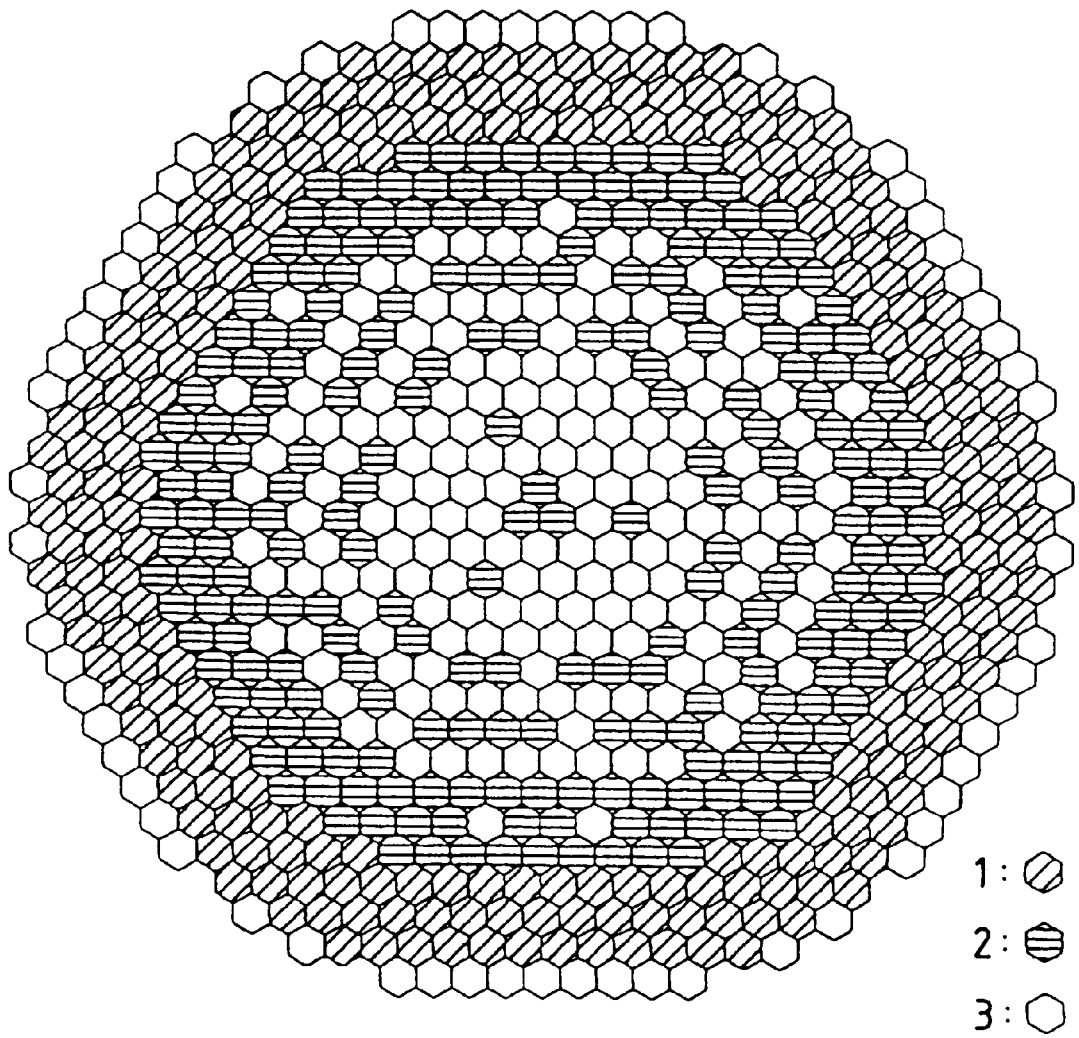
FIG. 12 is a chart for the arrangement of fuel assemblies in a equilibrium reactor core in a fourth embodiment according to the present invention.

A fourth embodiment according to the present invention will be explained with reference to FIG. 12 to FIG. 14. In this embodiment, the reactor core property is further improved based on the constitution of Embodiment 1, but a similar reactor core can be achieved also based on the constitution of Embodiment 2 or 3.

This embodiment shows a case of a reactor core of 1356 MWe electric power in which fuel burnup is enhanced. The horizontal cross section of the reactor core, the cross section of the fuel assembly lattice and the orifice distribution in this embodiment are identical with those in FIG. 1, FIG. 6 and FIG. 8 for Embodiment 1. FIG. 12 shows a fuel arrangement for a equilibrium reactor core. The numbers indicated on the fuel assembly show the staying period in the reactor core by the number of cycles. Third cycle fuels of the longest core staying period are loaded to the outermost circumference of the reactor core with a low neutron importance. In the outer reactor core region at the inside thereof, fuels at the first cycle of core staying period with the highest infinite medium neutron multiplication factor are loaded to flatten the radial power distribution in the reactor core. In an inner reactor core region, fuels at the second and third cycles of core staying period are loaded dispersively to flatten the power distribution in the inner region.

In this embodiment, since the burnup reactivity is reduced as compared with Embodiment 1 by providing a blanket portion to an axial central portion, the number of third cycle fuels is increased in a central region of the reactor core. FIG. 13 shows the distribution of the fissionable Pu enrichment in the axial direction averaged along the horizontal cross section of the fuel assembly for the equilibrium reactor core. Uranium to be enriched with Pu is degraded uranium. The reactor core height is 77 cm, which is divided into three regions 1, 2, 3 at 23 cm and 52 cm from the lower end of the reactor core, in which the fissionable Pu enrichment is 17 wt %, 0 wt % and 17 wt % respectively, with the average enrichment being 10.6 wt %. Further, degraded uranium blankets of 25 cm and 20 cm are attached to upper and lower portions of the reactor core respectively. FIG. 14 shows the power distribution and the void fraction distribution averaged along the direction of the reactor core height. The average reactor core void fraction is 60% and the steam weight ratio at the exit of the reactor core is 29%.

The constitution of the fuel assembly is identical with that in Embodiment 1, and the fuel assembly is a dense hexagonal fuel assembly comprising a regular triangular lattice at 1.3 mm of fuel rod gap. The combination of the average reactor core void fraction of 60% and the Y-type control rod can attain an effective water-to-fuel volume ratio of 0.27, in which an incore breeding ratio is 0.87, a blanket breeding ratio is 0.14 and a total breeding ratio is 1.01.

In this embodiment, the fissionable Pu enrichment comprises 17 wt % portions both in upper and lower portions along the axial direction of the fuel assembly and the central region therebetween comprises degraded uranium not containing the fissionable Pu. Upon power up or lowering of the reactor core coolant flow rate, the steam void fraction in the reactor core is increased in which the power distribution in the upper portion of the reactor core swings to the central region not containing the fissionable Pu. This can provide a greater effect of lowering the reactivity in the reactor core than that in Embodiment 1. As a result, the void coefficient could be kept at $-0.5 \times 10^{-4}$ k/k/% void which is identical with that in Embodiment 1 even if the fuel burnup is further increased to be greater than that in Embodiment 1.

In this embodiment, the same power can be attained as that in ABWR now under construction with a pressure vessel of a size substantially equal thereto and 70 GWd/t can be attained.

As compared with Embodiment 1, the reactor core portion is somewhat increased in the length as 77 cm but the Pu inventory is as less as 6.2 tons being converted as the amount of fissionable Pu per 1,000,000 kWe, and this is 10 tons or less per 1,000,000 kWe even when an outer core staying period of Pu such as in reprocessing is taken into consideration, to provide the same effect as in Embodiment 1.

Further, also in this embodiment, an equal or superior effect can be obtained with fuels formed by enriching Pu to natural uranium, depleted uranium recovered from spent fuels and low concentrated uranium instead of degraded uranium. Further, other actinoid nuclides can be enriched together with Pu. Further, in this embodiment, upper and lower portions identical with each other for the fissionable Pu enrichment are provided along the axial direction of the fuel assembly and degraded uranium not containing fissionable Pu is present therebetween. However, the fissionable Pu enrichment is not necessarily be equal between the upper and the lower portions. Further, in this embodiment, the region for degraded uranium is disposed somewhat higher than the central portion of the reactor core but this is not limitative. It is possible to attain an identical axial power peaking by the combination of the fissionable Pu enrichment in the upper and the lower portions and the position for the degraded uranium region.

Figure 21:
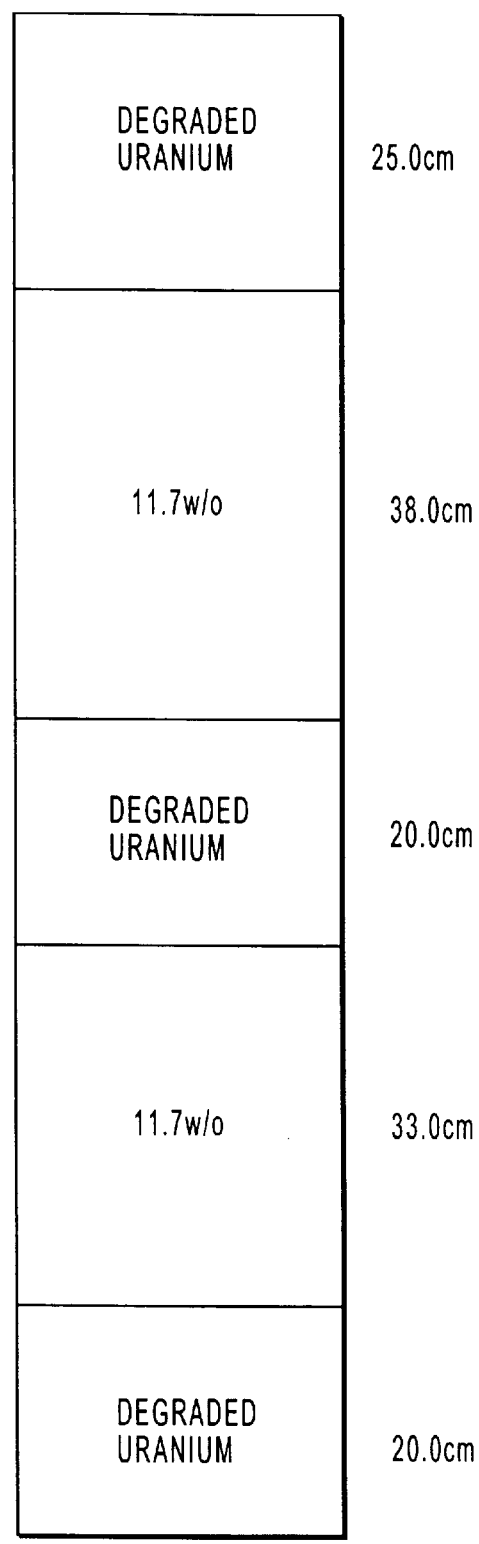
FIG. 21 is a distribution chart for the axial enrichment of a fuel assembly loaded in a reactor core in a fifth embodiment according to the present invention.
Figure 22:
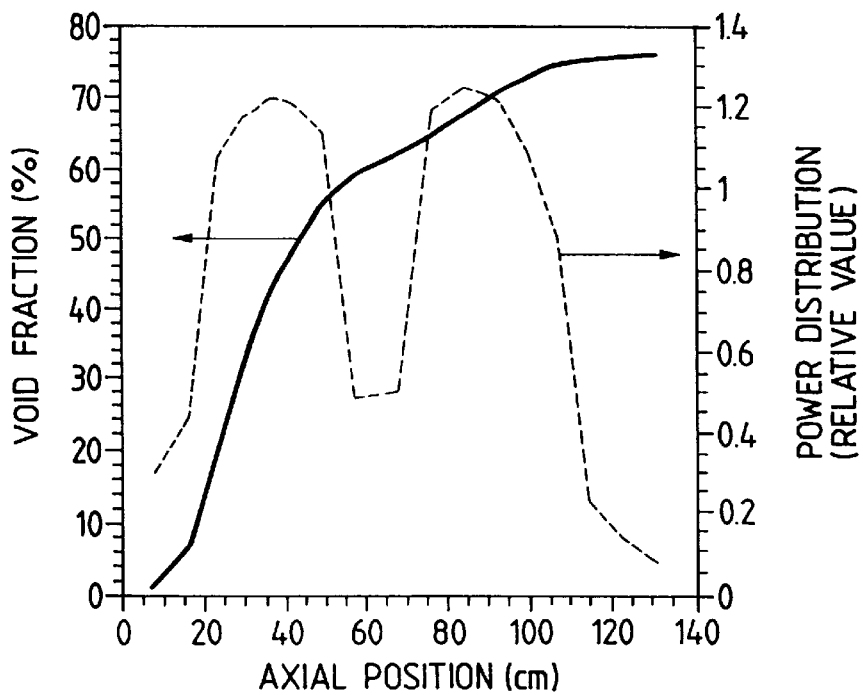
FIG. 22 is a characteristic chart illustrating an axial position in the reactor core and a void fraction distribution in a fifth embodiment according to the present invention.

A fifth embodiment according to the present invention will be explained with reference to FIG. 21 and FIG. 22. In this embodiment, the reactor core performance is further improved on the basis of the constitution of Embodiment 1 but an identical reactor core can also be attained on the basis of the constitution of Embodiment 2 or 3.

This embodiment is directed to a reactor core of 1356 MWe electric power, having a margin for the minimum critical power ratio and the maximum linear power density. The constitution of this embodiment along the horizontal cross section of the reactor core is identical with that in Embodiment 1. FIG. 21 shows the distribution in the axial direction of the enrichment of the fissionable Pu averaged along the horizontal cross section of the fuel assembly for the fifth embodiment. Pu-enriched uranium is degraded uranium. The reactor core height is 91 cm which is divided into three regions 1, 2 and 3 at 33 cm and 53 cm from the lower end of the reactor core in which the fissionable Pu enrichment in each of the regions is 11.7 wt %, 0 wt % and 11.7 wt % and 9.1 wt % in average. Further, degraded uranium blankets of 25 cm and 20 cm are attached to upper and lower ends of the reactor core respectively. FIG. 22 shows the power distribution and the void fraction distribution in average along the axial direction of the reactor core. The average reactor core void fraction is 57% and the steam weight ratio at the exit of the reactor core is 26%.

The constitution of the fuel assembly is identical with that in Embodiment 1, and the combination of the dense hexagonal fuel assembly of a regular triangular lattice at 1.3 mm of fuel rod gap, the average reactor core void fraction of 57% and the Y-type control rod attained an effective water-to-fuel volume ratio of 0.28, and an incore breeding ratio of 0.93, a blanket breeding ratio of 0.08 and a breeding ratio of 1.01 in total were attained.

In this embodiment, upper and lower regions along the axial direction of the fuel assembly have 11.7 wt % of the fissionable Pu enrichment, and a central region between them is composed of degraded uranium not containing the fissionable Pu. Upon power up or lowering of the reactor core coolant flow rate, the steam void fraction in the reactor core is increased, in which the power distribution in the upper region of the reactor core swings to the central region not containing the fissionable Pu. This can provide an effect of reducing the reactor core reactivity which is greater than that of Embodiment 1. As a result, the void coefficient could be kept to $-0.5 \times 10^{-4}$ k/k/% void which was identical with that in Embodiment 1 even if the reactor core height was increased to greater than that in. Embodiment 1. Further, since neutrons flow from the upper and the lower regions containing the fissionable Pu to the central region of the reactor core not containing the fissionable Pu, the breeding ratio can be increased. Accordingly, even if the reactor core flow rate is increased and the average reactor core void fraction is lowered to less than that in Embodiment 1, an equal or greater breeding ratio can be obtained. Further, as a result of increasing the reactor core flow rate, MCPR is 1.45 and a reactor core with an increased thermal margin as compared with that in Embodiment 1 can be attained.

Further, also in this embodiment, an equal or superior effect can be obtained also with fuels formed by enriching Pu to natural uranium, depleted uranium recovered from spent fuels and low concentrated uranium instead of degraded uranium, and other actinoid nuclides can be enriched together with Pu. Further, also in this embodiment, it is not always necessary that the fissionable Pu enrichment is equal between the upper and the lower regions, and the position for the degraded uranium at the central region of the reactor core is not restricted only to that described above.

Although the length of the reactor core was somewhat increased as 91 cm as compared with that in Embodiment 1, the Pu inventory is as less as 6.3 tons being converted as the amount of the fissionable Pu per 1,000,000 kWe power and this is 10 tons or less per 1,000,000 kWe even if the outer core staying period of Pu such as in reprocessing is taken into consideration and the same effect as that in Embodiment 1 can be obtained.

Figure 24:
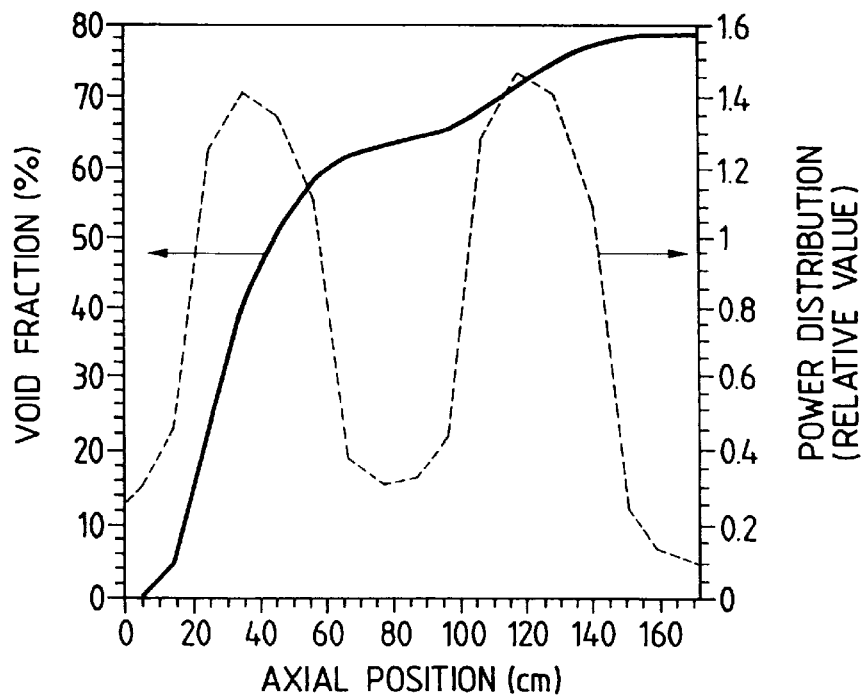
FIG. 24 is a characteristic chart illustrating an axial position in the reactor core and a void fraction distribution in a sixth embodiment according to the present invention.
Figure 23:
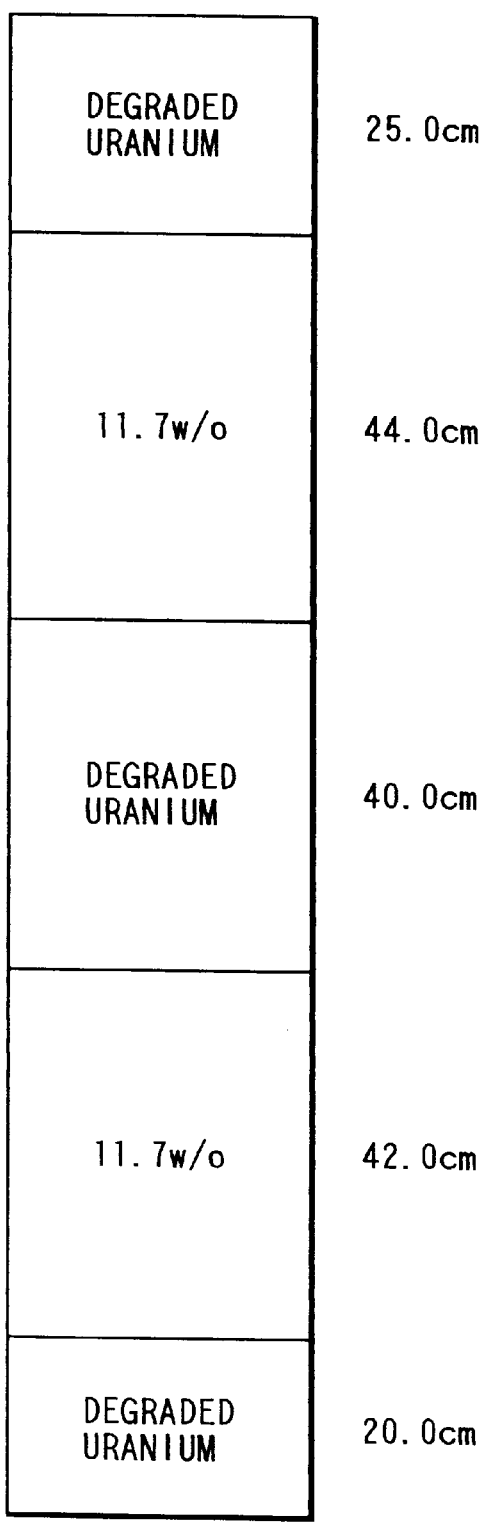
FIG. 23 is a distribution chart for the axial enrichment of the fuel assembly loaded in a reactor core in a sixth embodiment according to the present invention.

A sixth embodiment according to the present invention will be explained with reference to FIG. 23 and FIG. 24. In this embodiment, the reactor core performance is further improved on the basis of the constitution of Embodiment 1 but similar reactor core can also be attained on the basis of the constitution of Embodiment 2 or 3.

This embodiment is directed to a reactor core of 1356 MWe electric power, with an increased Pu inventory and having a feature as a Pu storing reactor. The constitution of this embodiment along the horizontal cross section of the reactor core is identical with that in Embodiment 1. FIG. 23 shows the distribution in the axial direction of the enrichment of the fissionable Pu averaged along the horizontal cross section of the fuel assembly of the sixth embodiment. Pu-enriched uranium is degraded uranium. The reactor core height is 126 cm, which is divided into three regions 1, 2 and 3 at 42 cm and 82 cm from the lower end of the reactor core in which the fissionable Pu enrichment in each of the regions is 11.7 wt %, 0 wt % and 11.7 wt %, with 8.0 wt % in average. Further, degraded uranium blankets of 25 cm and 20 cm are attached to the upper and lower ends of the reactor core respectively. FIG. 24 shows the power distribution and the void fraction distribution in average along the axial direction of the reactor core. The average reactor core void fraction is 60% and the steam weight ratio at the exit of the reactor core is 31%.

The constitution of the fuel assembly is identical with that in Embodiment 1, and the combination of the dense hexagonal fuel assembly of the regular triangular lattice at 1.3 mm of fuel rod gap, an average reactor core void fraction of 60% and the Y-type control rod can attain an effective water-to-fuel volume ratio of 0.27, and an incore breeding ratio of 0.95, and a blanket breed ratio of 0.07 and a breeding ratio, 1.02 in total were attained.

In this embodiment, upper and lower regions along the axial direction of the fuel assembly have 11.7 wt % of the fissionable Pu enrichment, and a central region between them is composed of degraded uranium not containing the fissionable Pu. As compared with Embodiments 4 and 5, the degraded uranium region in the central portion of the reactor core was increased to 40 cm, so that the effect of reducing the void coefficient and the effect of increasing the breeding ratio could be enhanced. This can increase the region containing fissionable Pu to make the Pu inventory to 10.3 tons.

Further, also in this embodiment, an equal or superior effect can be obtained also with fuels formed by enriching Pu to natural uranium, depleted uranium recovered from spent fuels and low concentrated uranium instead of degraded uranium, although the Pu inventory is somewhat reduced. Further, other actinoid nuclides can be enriched together with Pu.

Further, in this embodiment, upper and lower portions of identical fissionable Pu enrichment are provided in the axial direction of the fuel assembly and depleted uranium not containing the fissionable Pu is disposed therebetween. However, it is not always necessary that the fissionable Pu enrichment is equal to each other between the upper and the lower regions. Further, in this embodiment, although the region of the degraded uranium is disposed somewhat above the central region of the reactor core, this is not limitative.

Figure 25:
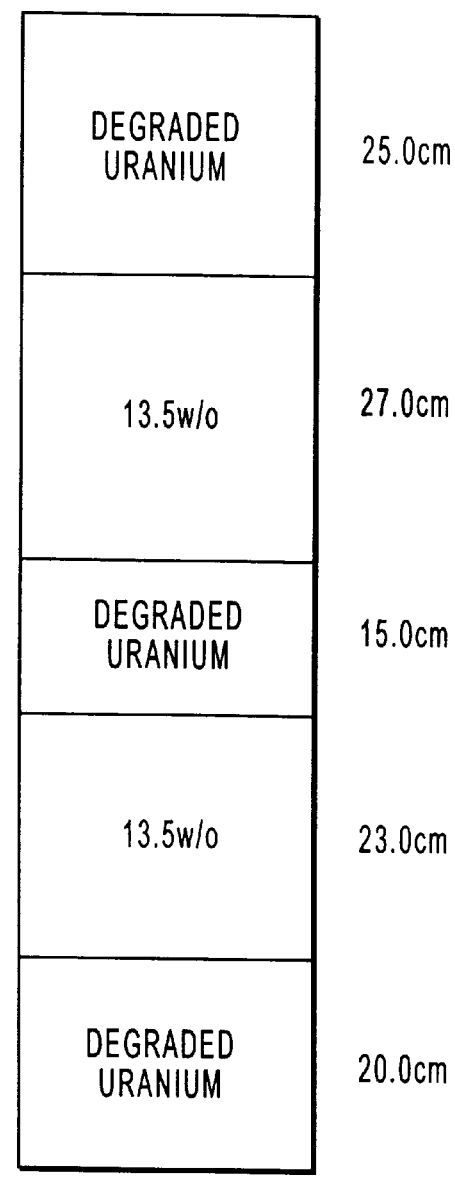
FIG. 25 is a distribution chart for the axial enrichment of a fuel assembly loaded in a reactor core in a seventh embodiment according to the present invention.
Figure 26:
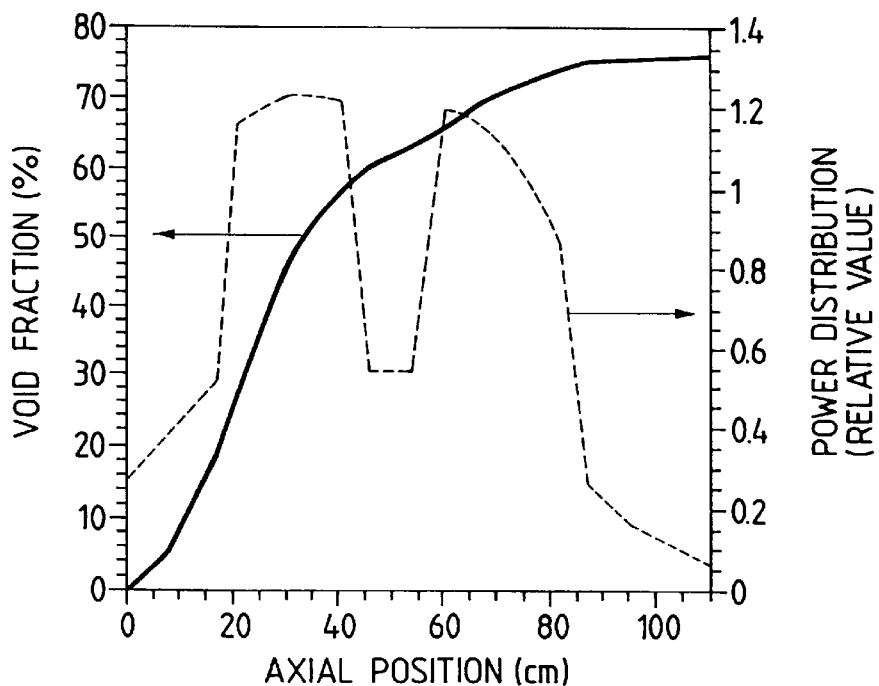
FIG. 26 is a characteristic chart illustrating an axial position in the reactor core and a void fraction distribution in the seventh embodiment according to the present invention.
Figure 27:
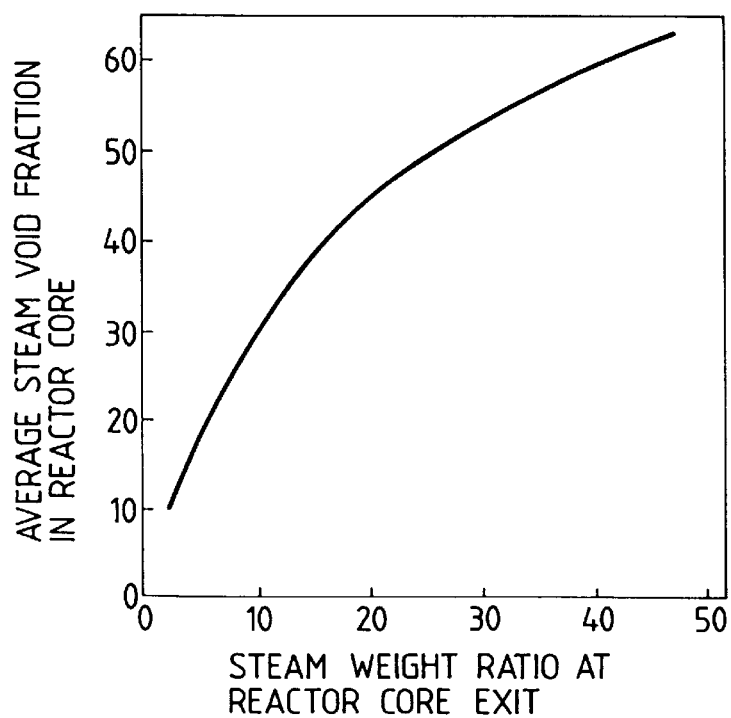
FIG. 27 is a characteristic chart illustrating a relationship between the average void fraction in the reactor core and a steam weight ratio at a reactor core exit.

A seventh embodiment according to the present invention will be explained with reference to FIG. 25 and FIG. 26. In this embodiment, the reactor core performance is further improved on the basis of the constitution of Embodiment 1 but an identical reactor core can also be attained on the basis of the constitution of Embodiment 2 or 3.

This embodiment is directed to a reactor core of 1356 MWe electric power, having increased negative void coefficient. The constitution of this embodiment along the horizontal cross section of the reactor core is identical with that in Embodiment 1. FIG. 25 shows the distribution in the axial direction of the enrichment of the fissionable Pu averaged along the horizontal cross section of the fuel assembly of the seventh embodiment. Pu-enriched uranium is degraded uranium. The reactor core height is 65 cm which is divided into three regions 1, 2 and 3 at 23 cm and 38 cm from the lower end of the reactor core in which the fissionable Pu enrichment in each of the regions is 13.5 wt %, 0 wt % and 13.5 wt %, with 10.5 wt % in average. Further, degraded uranium blankets of 25 cm and 20 cm are attached to upper and lower ends of the reactor core respectively. FIG. 26 shows the power distribution and the void fraction distribution in average along the axial direction of the reactor core. The average reactor core void fraction is 60% and the steam weight ratio at the exit of the reactor core is 29%.

The constitution of the fuel assembly is identical with that in Embodiment 1, and the combination of the dense hexagonal fuel assembly of a regular triangular lattice at 1.3 mm of fuel rod gap, an average reactor core void fraction of 60% and the Y-type control rod can attain an effective water-to-fuel volume ratio of 0.27, and an incore breeding ratio of 0.90 and a blanket breeding ratio of 0.12, a breeding ratio of 1.02 in total were attained.

In this embodiment, upper and lower regions along the axial direction of the fuel assembly have 13.5 wt % of the fissionable Pu enrichment, and a central region between them is composed of degraded uranium not containing the fissionable Pu. As compared with Embodiments 5 and 6, the upper and lower regions for the fissionable Pu in the reactor core are decreased and the along the axial direction of the fuel assembly an effect of reducing the void coefficient by the shortened length is further added. As a result, the void coefficient could be −1.8×10−4 k/k/%void. This enables power control or reactivity control by the flow rate control.

Further, also in this embodiment, an equal or superior effect can be obtained also with fuels formed by enriching Pu to natural uranium, depleted uranium recovered from spent fuels and low concentrated uranium instead of degraded uranium. Further, other actinoid nuclides can be enriched together with Pu.

Figure 31:
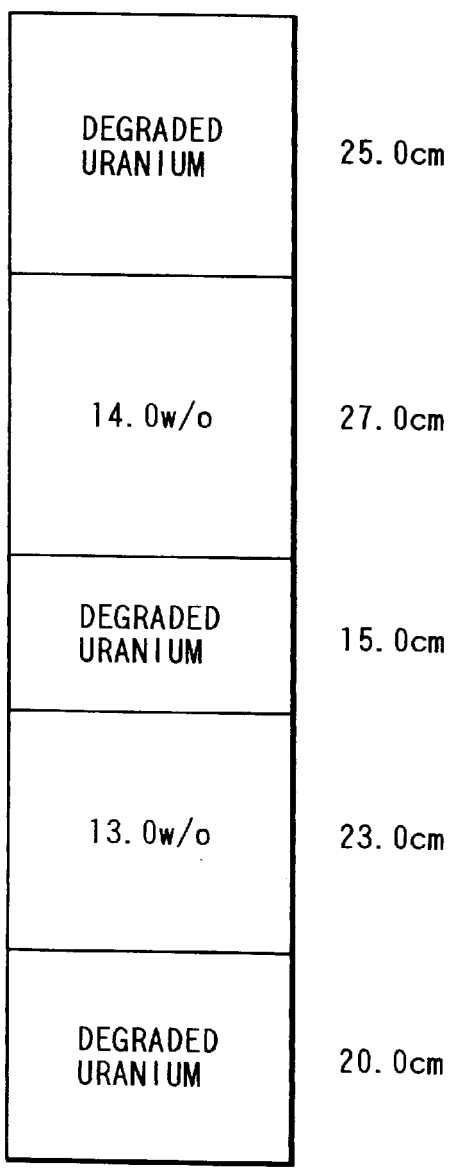
FIG. 31 is a modification embodiment of the axial enrichment distribution of the fuel assembly loaded in the reactor core in a seventh embodiment.

Further, in this embodiment, upper and lower regions of identical fissionable Pu enrichment are provided along the axial direction of the fuel assembly and depleted uranium not containing the fissionable Pu is disposed therebetween. However, it is not always necessary that the fissionable Pu enrichments are equal to each other between the upper and the lower regions. A modification of this embodiment for the fissionable Pu enrichment and the position for the degraded uranium region are shown in FIG. 31. Also in FIG. 31, the axial power peaking can be made equal to that in this embodiment.

Figure 33:
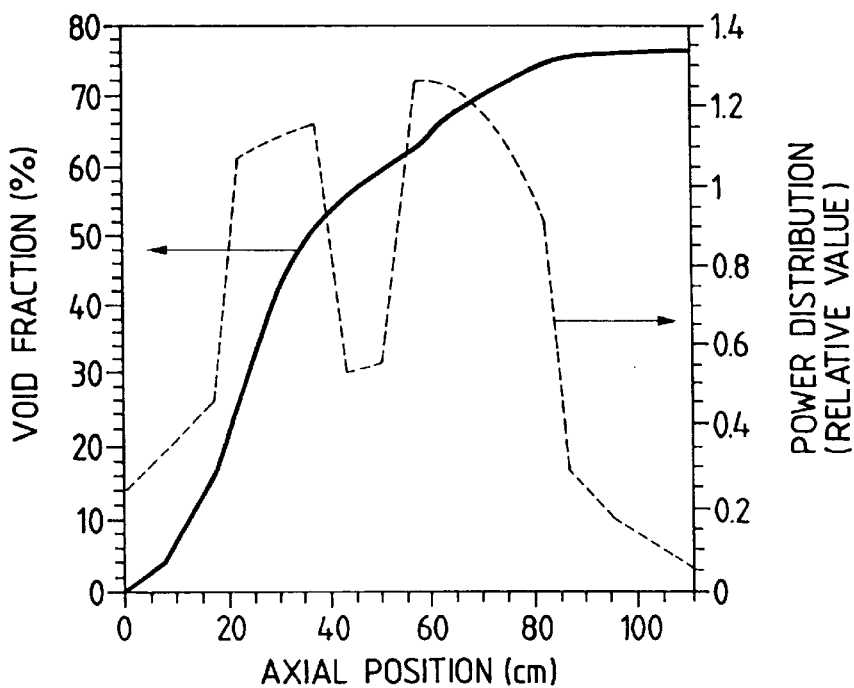
FIG. 33 is a characteristic chart illustrating an axial position and a void fraction distribution of the reactor core loaded with FIG. 32.
Figure 32:
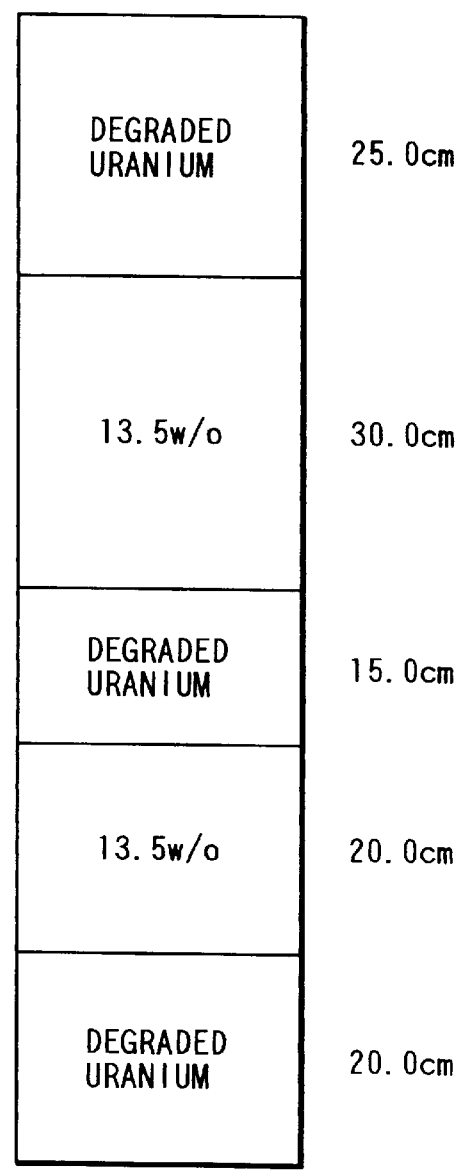
FIG. 32 is a modification embodiment of the axial enrichment distribution of a fuel assembly loaded in the reactor core in the seventh embodiment.

Further, FIG. 32 shows the distribution of the fissionable Pu enrichment in the axial direction averaged along the horizontal cross section of a fuel assembly, different from that in this embodiment. The Pu enriched uranium is degraded uranium like that in this embodiment, the reactor core height is 65 cm and degraded uranium blankets of 25 cm and 20 cm are attached to upper and lower ends of the reactor core respectively. It is divided into three regions 1, 2 and 3 at 25 cm and 35 cm from the lower end of the reactor core, in which the fissionable Pu enrichment are 13.5 wt %, 0 wt %, 13.5 wt % respectively, with 10.5 wt % in average. Since the degraded uranium region not containing the fissionable Pu is further displaced to the lower portion of the reactor core than that in this embodiment, the axial power distribution has an upper peak pattern as shown in FIG. 33, and the power fluctuation is increased upon increase of the void, to provide an effect of rendering the void reactivity coefficient more negative.

In an eighth embodiment, actinoid nuclides taken out of spent fuels are recycled together with Pu in the seventh embodiment.

The constitution of this embodiment as viewed along the horizontal cross section of the reactor core is identical with that in Embodiment 1. Also in the fuel assembly for this embodiment, the distribution of the fissionable Pu enrichment in the axial direction averaged along the horizontal cross section is identical with that in Embodiment 7. The Pu enriched uranium is uranium taken out of spent fuels together with plutonium, and actinoid nuclides taken out of the spent fuels are added simultaneously. The fissionable Pu enrichment is 13.5 wt %, 0 wt % and 13.5 wt %, with 10.5 wt % in average. Further, degraded uranium blankets of 25 cm and 20 cm are attached to the upper and the lower regions of the reactor core respectively.

The constitution of the fuel assembly is identical with that in Embodiment 1, and the combination of the dense hexagonal fuel assembly of a regular triangular lattice at 1.3 mm of fuel rod gap, an average reactor core void fraction of 61% and the Y-type control rod can attain an effective water-to-fuel volume ratio of 0.27, and an incore breeding ratio of 0.91, and a blanket breed ratio of 0.10, a breeding ratio of 1.01 in total were attained.

In this embodiment, upper and lower regions along the axial direction of the fuel assembly have 13.5 wt % of the fissionable Pu enrichment, and a central region between them is composed of degraded uranium not containing the fissionable Pu. As compared with Embodiments 5 and 6, the upper and lower regions for the fissionable Pu in the reactor core are decreased and an effect of reducing the void coefficient by the shortened length is further added. As a result, if the actinoid nuclides taken out of the spent fuels are recycled together with Pu, the void coefficient can be rendered negative.

Further, by recycling the actinoid nuclides taken out of the spent fuels together with Pu repeatedly, the long life radioactive nuclides attain a equilibrated state in the reactor to reach a predetermined amount. Accordingly, in this embodiment, the amount of generation and the amount of annihilation of the actinoid nuclides are equilibrated, the increment becomes to zero, by which the entire generation amount of the long half-life actinoid nuclides, that particularly result in problems among the radioactive wastes, can be reduced remarkably, as well as actinoid nuclides containing Pu can be confined only within the nuclear reactor, the reprocessing facility and the fuel production facility.

Figure 34:
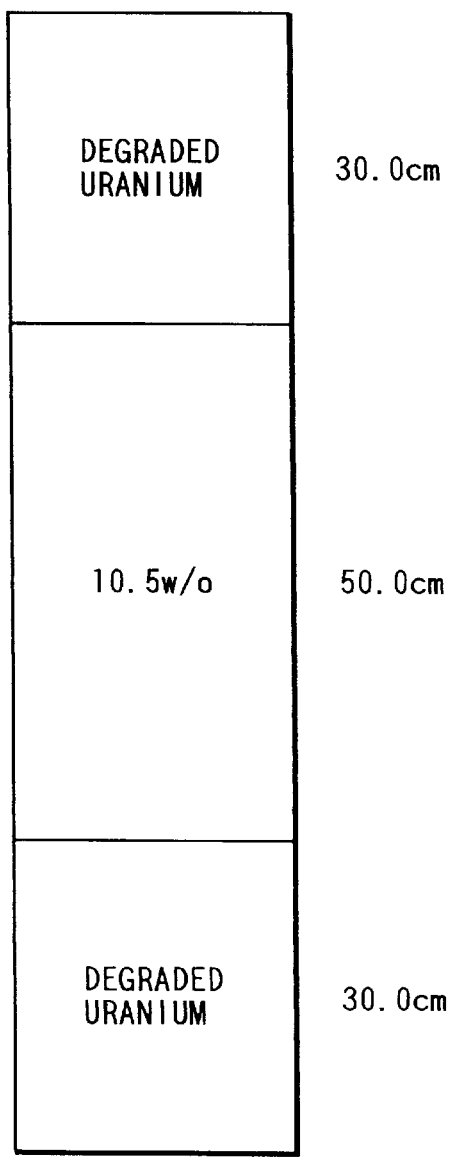
FIG. 34 is a distribution chart for the axial enrichment of a fuel assembly loaded in a reactor core in a ninth embodiment.
Figure 35:
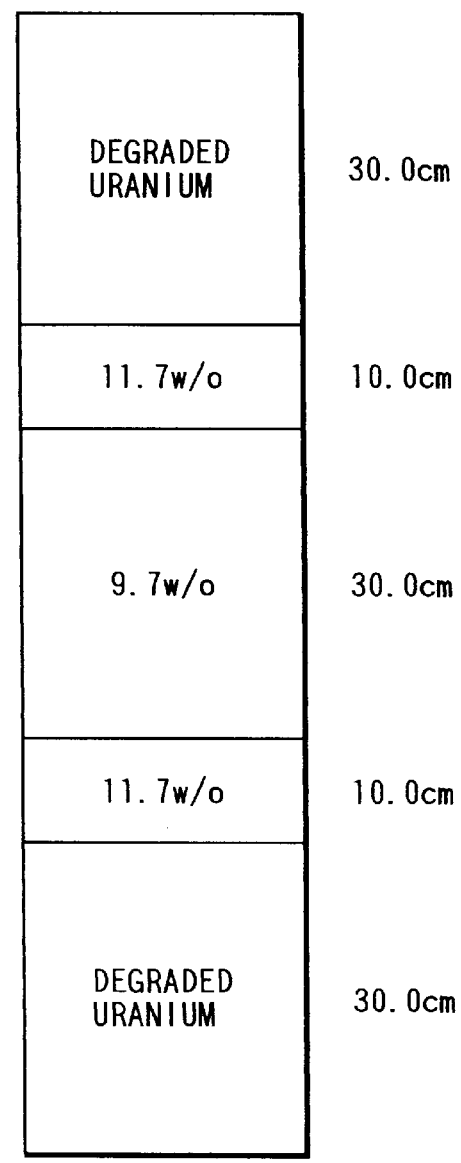
FIG. 35 is a modification embodiment of an axial enrichment distribution of the fuel assembly loaded in the reactor core in the ninth embodiment.
Figure 36:
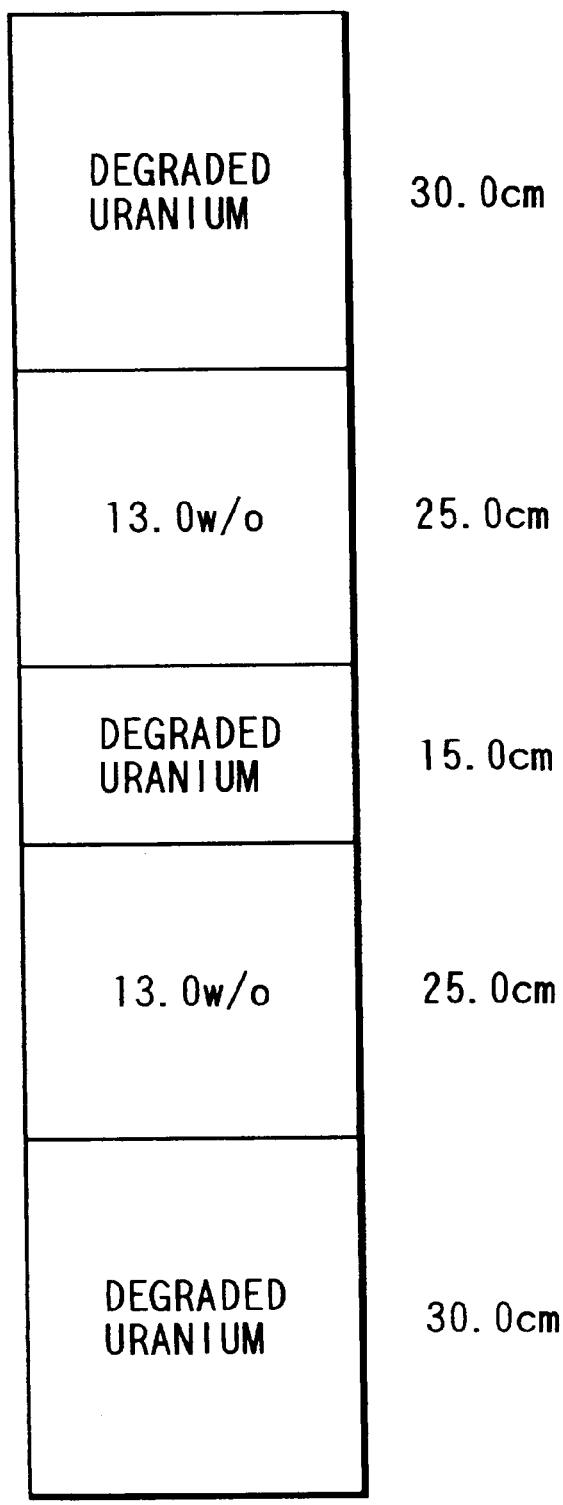
FIG. 36 is a modification embodiment of the axial enrichment distribution of the fuel assembly loaded in the reactor core in the ninth embodiment.

In a ninth embodiment, as shown in FIGS. 34 to 36 the present invention is applied to PWR.

In this embodiment, a reactor core comprises the same cluster-type control rods as those in Embodiment 3 and regular hexagonal fuel assemblies in which fuel rods having an outer diameter of 14.3 mm greater than that of each existent PWR are arranged densely in a regular triangular lattice pattern at 1.0 mm of fuel rod gap. FIG. 34 shows the distribution of the fissionable Pu enrichment in the axial direction averaged along the horizontal cross section of the fuel assembly for the ninth embodiment. The Pu enriched uranium is degraded uranium. The height of the reactor core is 50 cm and the fissionable Pu enrichment is made uniform as 10.5 wt %. Degraded uranium blankets each of 30 cm are attached to upper and lower ends of the reactor core portion.

The combination of the dense hexagonal fuel assembly with a regular triangular lattice at 1.0 mm of fuel rod gap, fuel rods of large diameter and the cluster-type control rods can attain a water-to-fuel volume ratio of 0.44. As a result, an incore breeding ratio of 0.90, a blanket breeding ratio of 0.11 and thus a total breeding ratio of 1.01 was attained.

In this embodiment, the fissionable Pu enrichment is made uniform in the axial direction of the fuel assembly. However, the constitution of the fuels is not restricted only thereto. FIG. 35 and FIG. 36 show modifications of this embodiment regarding the axial distribution of the fissionable Pu enrichment. In FIG. 35, the fissionable Pu enrichment in the upper and lower ends of the reactor core is made greater than that in the central region for further flattening the axial power peaking. In FIG. 36, the reactor core height is 65 cm which is divided into three regions 1, 2 and 3 at 25 cm and 40 cm from the lower end of the reactor core in which the fissionable Pu enrichment for each of them is 13.0 wt %, 0 wt % and 13.0 wt % respectively and 10 wt % in average. Further, degraded uranium blankets each of 30 cm are attached to the upper and lower ends of the reactor core. Since the degraded uranium region not containing the fissionable Pu is present at the central portion of the reactor core, the charged reactivity upon generation of void can be made more negative.

In this embodiment, the outer diameter of the fuel rod used is 14.3 mm which is greater than the outer diameter of the fuel rods in existent PWR but 9.5 mm in the existent PWR may also be used. In this instance, the combination of the dense hexagonal fuel assembly of a regular triangular lattice at 1.0 mm of fuel rod gap and the cluster-type control rod can provide a water-to-fuel volume ratio of 0.58. Since the water-to-fuel volume ratio is increased, the fissionable Pu enrichment has to be increased by about 0.5 wt % in this embodiment, but breeding ratio of 1.0 can be attained.

Further, also in this embodiment, fuels formed by enriching Pu to natural uranium, depleted uranium recovered from spent fuels and low concentrated uranium instead of degraded uranium can be used. Further, other actinoid nuclides may be enriched together with Pu.

Figure 37:
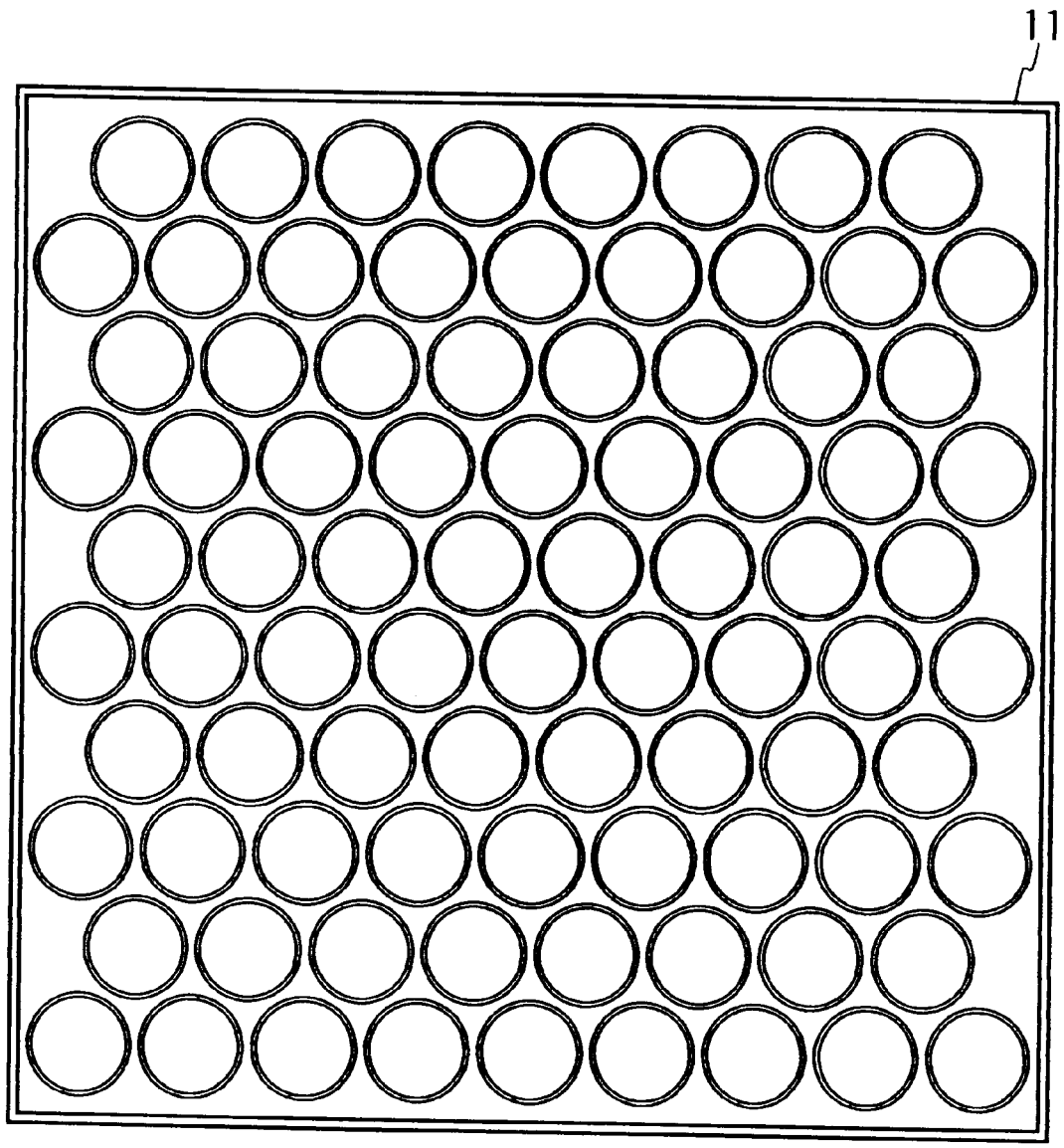
FIG. 37 is a horizontal cross sectional view of a fuel assembly in a tenth embodiment according to the present invention.

In a tenth embodiment, as shown in FIG. 37 the present invention is applied to the same square fuel assembly as that in existent PWR.

FIG. 37 shows the constitution of the fuel assembly in this embodiment. For reducing the water-to-fuel volume ratio, fuel rods having an outer diameter of 13.8 mm greater than that of existent BWR were arranged densely in a regular triangular lattice pattern at 1.0 mm of fuel rod gap. The number of the fuel rods per fuel assembly is 85. Moderator at the outside of a channel box 11 is excluded by a follower portion disposed at the upper end of the cruciform control rod and a gap water region on the opposite side not inserted with the control rod is excluded by a water excluding plate made of a material having a smaller moderation function like that of the follower portion. This can attain an effective water-to-fuel volume ratio of 0.53 and a breeding ratio of 1.0 can be attained by the same fuel constitution in the direction of the reactor core height as in other embodiments. For flattening the fuel rod power peaking in the fuel assembly, the fissionable Pu enrichment of the fuel rods facing the channel box is made lower than that of fuel rods in other regions in this embodiment.

Further, also in this embodiment, fuels formed by enriching Pu to natural uranium, depleted uranium recovered from spent fuels and low concentrated uranium instead of degraded uranium may be used. Further, other actinoid nuclides may be enriched together with Pu.

What is claimed is:

1. A reactor core for a boiling water reactor having hexagonal fuel assemblies containing fuels comprising uranium enriched with plutonium or plutonium with actinoid nuclides and cluster-type control rods,
   wherein the hexagonal fuel assembly has an effective water-to-fuel volume ratio of between 0.1 and 0.6 and a length of a portion having an average enrichment of fissionable plutonium of 6 wt % or more along a horizontal cross section of the fuel assembly is between 40 cm and 140 cm in the direction of the height of the fuel assembly, whereby a breeding ratio of about 1.0 or more is achieved.

2. A reactor core as claimed in claim 1, wherein the hexagonal fuel assembly has fuel rods arranged densely in a regular triangle lattice pattern and a gap between the fuel rods of from 0.7 to 2.0 mm.

3. A reactor core as claimed in claim 1, wherein the hexagonal fuel assembly has a first portion having an average enrichment of fissionable plutonium of 6 wt % or more and being divided into an upper portion and a lower portion along the axial direction of the fuel assembly, and a second portion having an average enrichment of fissionable plutonium of 6 wt % or less being present between the upper portion and the lower portion.

4. A reactor core as claimed in claim 3, wherein an average enrichment of fissionable plutonium in the upper portion of the hexagonal fuel assembly is different from that in the lower portion of the hexagonal fuel assembly.

5. A reactor core for a boiling water reactor having hexagonal fuel assemblies containing fuels comprising uranium enriched with plutonium or plutonium and actinoid nuclides and cluster-type control rods,
   wherein the hexagonal fuel assembly has fuel rods arranged in a regular triangular lattice pattern so as to form three sets of fuel rod rows, each set of fuel rod rows being parallel with a pair of opposing sides of the hexagonal fuel assembly and the number of rows in two sets of fuel rod rows being equal to each other and greater by one row than that of the remaining one set of fuel rod rows among the three sets of fuel rod rows.

6. A reactor core as claimed in claim 5, wherein an effective water-to-fuel volume ratio is between 0.1 and 0.6.

7. A reactor core as claimed in claim 5, wherein an average void ratio for the reactor core during operation at 50% or more rated power is from 45% to 70%.

8. A reactor core as claimed in claim 1, wherein plutonium and uranium taken out of spent fuels are recycled together.

9. A reactor core as claimed in claim 5, wherein plutonium and uranium taken out of spent fuels are recycled together.

10. A reactor core as claimed in claim 1, wherein the uranium is at least one of degraded uranium, natural uranium, depleted uranium and low concentrated uranium.

11. A reactor core as claimed in claim 5, wherein the uranium is at least one of degraded uranium, natural uranium, depleted uranium and low concentrated uranium.

* * * * *